United States Patent
Pang et al.

(10) Patent No.: US 9,860,910 B2
(45) Date of Patent: Jan. 2, 2018

(54) METHOD AND APPARATUS FOR OBTAINING MAPPING BETWEEN RANDOM ACCESS PARAMETER AND RESOURCE

(71) Applicant: Huawei Technologies Co., Ltd., Shenzhen (CN)

(72) Inventors: Lingli Pang, Shanghai (CN); Xiaoxiao Zheng, Shanghai (CN); Xueli Ma, Shenzhen (SE); Fan Wang, Stockholm (SE)

(73) Assignee: Huawei Technologies Co., Ltd., Shenzhen (CN)

( * ) Notice: Subject to any disclaimer, the term of this patent is extended or adjusted under 35 U.S.C. 154(b) by 254 days.

(21) Appl. No.: 14/800,500

(22) Filed: Jul. 15, 2015

(65) Prior Publication Data

US 2015/0341950 A1   Nov. 26, 2015

Related U.S. Application Data

(63) Continuation of application No. PCT/CN2013/073523, filed on Mar. 30, 2013.

(30) Foreign Application Priority Data

Jan. 17, 2013  (WO) ................ PCT/CN2013/070628

(51) Int. Cl.
   *H04W 72/12*  (2009.01)
   *H04W 74/08*  (2009.01)
   (Continued)

(52) U.S. Cl.
   CPC ..... *H04W 72/1263* (2013.01); *H04W 74/008* (2013.01); *H04W 74/0833* (2013.01); *H04W 28/18* (2013.01); *H04W 72/00* (2013.01)

(58) Field of Classification Search
   CPC ............ H04W 72/00; H04W 72/1263; H04W 74/008; H04W 74/0823; H04W 28/18; H04W 74/0833
   (Continued)

(56) References Cited

U.S. PATENT DOCUMENTS

2012/0155420 A1  6/2012  Sambhwani et al.
2012/0176951 A1*  7/2012  Pradas ................ H04W 74/08
                                                         370/312
(Continued)

FOREIGN PATENT DOCUMENTS

CN    101547510 A    9/2009
CN    101562896 A    10/2009
(Continued)

OTHER PUBLICATIONS

"3rd Generation Partnership Project; Technical Specification Group Radio Access Network; Radio Resource Control (RRC); Protocol specification (Release 11)," 3GPP TS 25.331, V11.4.0, pp. 1-2056, 3rd Generation Partnership Project, Valbonne, France (Dec. 2012).
(Continued)

*Primary Examiner* — Kan Yuen
*Assistant Examiner* — Richard Chang
(74) *Attorney, Agent, or Firm* — Leydig, Voit & Mayer, Ltd.

(57) ABSTRACT

A method and an apparatus for obtaining a mapping between a random access parameter and a resource are disclosed in embodiments of the present invention, where the method includes: obtaining a random access parameter list, and obtaining a serial number of a parameter in the random access parameter list; obtaining a resource list; and obtaining a mapping between the random access parameter and a common enhanced dedicated channel resource in the resource list according to the obtained serial number of the random access parameter and the total number of resources in the obtained resource list, so that a network side device determines, according to the random access parameter sent by a UE, whether a corresponding common enhanced dedicated channel resource is available. In this way, a mapping between a signature and a default common E-DCH resource
(Continued)

can be defined, and a problem of relatively low random access efficiency is solved.

16 Claims, 12 Drawing Sheets

(51) Int. Cl.
  *H04W 74/00* (2009.01)
  *H04W 28/18* (2009.01)
  *H04W 72/00* (2009.01)

(58) Field of Classification Search
  USPC .......................................................... 370/329
  See application file for complete search history.

(56) References Cited

U.S. PATENT DOCUMENTS

| | | | |
|---|---|---|---|
| 2012/0250644 A1 | 10/2012 | Sambhwani et al. | |
| 2013/0142076 A1* | 6/2013 | Ramos | H04W 24/00 370/254 |
| 2013/0170444 A1* | 7/2013 | Pani | H04W 72/0413 370/329 |
| 2015/0092731 A1 | 4/2015 | Aminaka et al. | |

FOREIGN PATENT DOCUMENTS

| | | |
|---|---|---|
| CN | 101911811 A | 12/2010 |
| CN | 101978756 A | 2/2011 |
| CN | 102740462 A | 10/2012 |
| RU | 2462839 C2 | 2/2012 |
| RU | 2010132684 A | 2/2012 |
| WO | WO 2009088872 A1 | 7/2009 |
| WO | 2257086 A1 | 12/2010 |
| WO | WO 2012044240 A1 | 4/2012 |

OTHER PUBLICATIONS

"3$^{rd}$ Generation Partnership Project; Technical Specification Group Radio Access Network; Physical channels and mapping of transport channels onto physical channels (FDD) (Release 11)," 3GPP TS 25.211, V11.2.0, pp. 1-63, 3$^{rd}$ Generation Partnership Project, Valbonne, France (Dec. 2012).

* cited by examiner

METHOD AND APPARATUS FOR OBTAINING MAPPING BETWEEN RANDOM ACCESS PARAMETER AND RESOURCE

CROSS-REFERENCE TO RELATED APPLICATIONS

This application is a continuation of International Patent Application No. PCT/CN2013/073523 filed on Mar. 30, 2013, which claims priority to International Application PCT/CN2013/070628, filed on Jan. 17, 2013, both of which are hereby incorporated by reference in their entireties.

TECHNICAL FIELD

The present invention relates to the field of communications technologies, and in particular, to a method and an apparatus for obtaining a mapping between a random access parameter and a resource.

BACKGROUND

A user equipment (UE) in a non-dedicated connection state can obtain, only through a random access process, a resource for sending uplink data. In an enhanced random access process, when selecting an access signature, the UE selects a resource for sending data transmission subsequently. A network side device determines, according to a mapping between a signature and a resource, a resource accessed by the UE. A resource corresponding to a signature is called a default resource. After the network side device detects a UE that performs random access, if it is determined that a default resource applied for by the UE is not occupied, that is, the default resource applied for by the UE is available, the network side device grants a resource to the UE by using acknowledgement (ACK) information in an acquisition index (AI). The UE sends data by using the granted default resource.

In the prior art, in a common enhanced dedicated channel (Common E-DCH) feature, a mapping between a signature and a default E-DCH resource is defined in the following formula (1):

$$X = \text{SigInd} \bmod Y \quad (1)$$

where X is a default E-DCH resource index, Y is the total number of E-DCH resources in a cell that can be used for enhanced uplink access in a cell forward access channel (Cell_FACH) state and in an idle state, and SigInd is the $S^{th}$ signature allocated to the enhanced uplink access in the cell, which is numbered from zero (0).

The default E-DCH resource is actually a Common E-DCH resource. Configuration information of the Common E-DCH resource is included in the standard protocol 25.331: Common E-DCH system info 10.3.6.9a, which currently supports a maximum of 32 sets of resources, and a serial number (or called an index (index)) corresponding to each set of resources is a sequence of the resources that appear in the configuration information. If the default resource applied for by the UE is not occupied, the network side device allocates the default Common E-DCH resource to the UE to perform data transmission.

The foregoing mapping between the default E-DCH resource and the signature is calculated based on a feature that currently, a common enhanced dedicated channel (Common E-DCH) is designed to support only one physical random access channel (PRACH).

After the cell forward access channel state is further enhanced, a signature allocated to the enhanced uplink access in the cell is further divided, and multiple PRACH channels are introduced. The signature and a PRACH channel are used to indicate a capability of the UE during the random access. When the signature allocated to the enhanced uplink access in the cell is further divided and multiple PRACHs are introduced, a default resource corresponding to each signature and each PRACH channel is not defined, so that the UE cannot know, during the random access, a resource corresponding to a selected random access parameter and finally cannot complete a random access process effectively.

If the foregoing formula (1) continues to be used to configure a mapping between the signature and the default E-DCH resource, multiple different random access parameters (that is, a Signature and a PRACH) may correspond to a same set of default resources, so that a conflict probability increases and network access efficiency of the UE is reduced; or when the UE selects some random access parameters to compete for a 2 ms resource, it actually obtains a 10 ms resource, so that the UE cannot perform data transmission correctly.

SUMMARY

Embodiments of the present invention provide a method and an apparatus for obtaining a mapping between a random access parameter and a resource to solve a problem of relatively low random access efficiency in the prior art caused due to that when there are multiple PRACHs, a mapping between a signature and a default common E-DCH resource cannot be defined.

A first aspect of embodiments of the present invention provides a method for obtaining a mapping between a random access parameter and a resource, where the method includes:

obtaining a random access parameter list, and obtaining a serial number of a parameter in the random access parameter list;

obtaining a resource list; and obtaining a mapping between the random access parameter and a common enhanced dedicated channel resource in the resource list according to the obtained serial number of the random access parameter and the total number of resources in the obtained resource list.

In a first possible implementation manner of the first aspect in the embodiments of the present invention, the random access parameter list includes a random access parameter in a first system information block and a random access parameter in type 1 in a second system information block; and a serial number of the random access parameter in the first system information block is smaller than a serial number of the random access parameter in type 1;

the obtaining a resource list includes: obtaining a list of a common enhanced dedicated channel resource corresponding to a cell-level transmission time interval TTI in the first system information block; and the obtaining a mapping between the random access parameter and a common enhanced dedicated channel resource according to the obtained serial number of the random access parameter and the total number of resources in the obtained resource list specifically includes:

performing a modulo operation for the serial number of the parameter in the random access parameter list and the total number of resources in the resource list, where the operation result indicates a default common enhanced dedicated channel resource corresponding to the random access parameter and the operation is expressed by using a formula: X=SigInd mod Y, where:

X is a default common enhanced dedicated channel resource index, Y is the total number of resources in the resource list, and SigInd is the serial number of the parameter in the random access parameter list.

In a second possible implementation manner of the first aspect in the embodiments of the present invention, the random access parameter list includes a random access parameter in type 2 in a second system information block and a random access parameter in type 3 in the second system information block;

the obtaining a resource list specifically includes: obtaining a list of a 2 ms common enhanced dedicated channel resource in a first system information block; and the obtaining a mapping between the random access parameter and a common enhanced dedicated channel resource according to the obtained serial number of the random access parameter and the total number of resources in the obtained resource list specifically includes:

performing a modulo operation for the serial number of the parameter in the random access parameter list and the total number of resources in the obtained list of the 2 ms common enhanced dedicated channel resource in the first system information block, where the operation result is used to indicate a default common enhanced dedicated channel resource corresponding to the random access parameter and the operation is expressed by using a formula: X'=SigInd mod Z, where:

X' is a default common enhanced dedicated channel resource index and is used to indicate a serial number of a resource in the list of the 2 ms common enhanced dedicated channel resource, Z is the total number of resources in the list of the 2 ms common enhanced dedicated channel resource in the first system information block, and SigInd is the serial number of the parameter in the random access parameter list.

In a third possible implementation manner of the first aspect in the embodiments of the present invention, the random access parameter list includes a random access parameter in type 2 in a second system information block and a random access parameter in type 3 in the second system information block;

the obtaining a resource list specifically includes: obtaining a list that includes only a 2 ms common enhanced dedicated channel resource in a first system information block; and the obtaining a mapping between the random access parameter and a common enhanced dedicated channel resource according to the obtained serial number of the random access parameter and the total number of resources in the obtained resource list specifically includes:

performing a modulo operation for the serial number of the parameter in the random access parameter list and the total number of resources in the obtained list of the 2 ms common enhanced dedicated channel resource in the first system information block, where the operation result is expressed as (SigInd mod Z); and obtaining, according to a formula X'=(Z-1)-(SigInd mod Z), a default common enhanced dedicated channel resource corresponding to the random access parameter, where:

X' is a default common enhanced dedicated channel resource index and is used to indicate a serial number of a resource in the list of the 2 ms common enhanced dedicated channel resource, Z is the total number of resources in the list of the 2 ms common enhanced dedicated channel resource in the first system information block, and SigInd is the serial number of the parameter in the random access parameter list.

In a fourth possible implementation manner of the first aspect in the embodiments of the present invention, the random access parameter list includes a random access parameter in type 2 in a second system information block;

the obtaining a resource list specifically includes: obtaining a list of a 2 ms common enhanced dedicated channel resource in a first system information block; and the obtaining a mapping between the random access parameter and a common enhanced dedicated channel resource according to the obtained serial number of the random access parameter and the total number of resources in the obtained resource list specifically includes:

performing a modulo operation for the serial number of the parameter in the random access parameter list and the total number of resources in the obtained list of the 2 ms common enhanced dedicated channel resource in the first system information block, where the operation result is used to indicate a default common enhanced dedicated channel resource corresponding to the random access parameter and the operation is expressed by using a formula: X'=SigInd mod Z, or the operation is expressed by using a formula X'=(Z-1)-(SigInd mod Z), where:

X' is a default common enhanced dedicated channel resource index and is used to indicate a serial number of a resource in the list of the 2 ms common enhanced dedicated channel resource, Z is the total number of resources in the list of the 2 ms common enhanced dedicated channel resource in the first system information block, and SigInd is the serial number of the parameter in the random access parameter list.

In a fifth possible implementation manner of the first aspect in the embodiments of the present invention, the random access parameter list includes a random access parameter in type 3 in a second system information block;

the obtaining a resource list specifically includes: obtaining a list of a 2 ms common enhanced dedicated channel resource in a first system information block; and the obtaining a mapping between the random access parameter and a common enhanced dedicated channel resource according to the obtained serial number of the random access parameter and the total number of resources in the obtained resource list specifically includes:

performing a modulo operation for the serial number of the parameter in the random access parameter list and the total number of resources in the obtained list of the 2 ms common enhanced dedicated channel resource in the first system information block, where the operation result is used to indicate a default common enhanced dedicated channel resource corresponding to the random access parameter and the operation is expressed by using a formula: X'=SigInd mod Z, or the operation is expressed by using a formula X'=(Z-1)-(SigInd mod Z), where:

X' is a default common enhanced dedicated channel resource index and is used to indicate a serial number of a resource in the list of the 2 ms common enhanced dedicated channel resource, Z is the total number of resources in the list of the 2 ms common enhanced dedicated channel resource in the first system information block, and SigInd is the serial number of the parameter in the random access parameter list.

With reference to the fourth possible implementation manner and the fifth possible implementation manner of the first aspect in the embodiments of the present invention, the method further includes: obtaining, by a corresponding user in the fourth possible implementation manner, a mapping between the random access parameter and the default common enhanced dedicated channel resource by using a formula X'=SigInd mod Z; and obtaining, by a corresponding user in the fifth possible implementation manner, a mapping between the random access parameter and the default common enhanced dedicated channel resource by using a formula X'=(Z−1)−(SigInd mod Z); or obtaining, by a corresponding user in the fourth possible implementation manner, a mapping between the random access parameter and the default common enhanced dedicated channel resource by using the formula X'=(Z−1)−(SigInd mod Z); and obtaining, by a corresponding user in the fifth possible implementation manner, a mapping between the random access parameter and the default common enhanced dedicated channel resource by using the formula X'=SigInd mod Z.

With reference to any one of the second to the fifth possible implementation manners of the first aspect in the embodiments of the present invention, the method further includes: obtaining a corresponding serial number of the default common enhanced dedicated channel common E-DCH resource in the first system information block by using a formula X=X'+concurrent TTI partition index, where X is the corresponding serial number of the default common E-DCH resource in the first system information block, and the Concurrent TTI partition index is a start serial number of the 2 ms common E-DCH resource in the first system information block.

In a seventh possible implementation manner of the first aspect in the embodiments of the present invention, the random access parameter list includes four parts: a random access parameter in a first system information block, a random access parameter in type 1 in a second system information block, a random access parameter in type 2 in the second system information block, and a random access parameter in type 3 in the second system information block; or, the random access parameter list includes three parts: a random access parameter in a first system information block, a random access parameter in type 2 in a second system information block, and a random access parameter in type 3 in the second system information block; or, the random access parameter list includes only a random access parameter in type 1 in a second system information block; or, the random access parameter list includes a random access parameter in a first system information block and a random access parameter in type 2 in a second system information block; or, the random access parameter list includes a random access parameter in a first system information block and a random access parameter in type 3 in a second system information block; and the obtaining a mapping between the random access parameter and a common enhanced dedicated channel resource according to the obtained serial number of the random access parameter and the total number of resources in the obtained resource list specifically includes:

performing a modulo operation for the serial number of the parameter in the random access parameter list and the total number of resources in the resource list, where the operation result indicates a default common enhanced dedicated channel resource corresponding to the random access parameter and the operation is expressed by using a formula: X=SigInd mod Y, where:

X is a default common enhanced dedicated channel resource index, Y is the total number of resources in the resource list, and SigInd is the serial number of the parameter in the random access parameter list.

In a seventh possible implementation manner of the first aspect in the embodiments of the present invention, the random access parameter list includes a random access parameter in type 1 in a second system information block and a random access parameter in a first system information block; and a serial number of the random access parameter in the first system information block is larger than a serial number of the random access parameter in type 1; and the obtaining a mapping between the random access parameter and a common enhanced dedicated channel resource according to the obtained serial number of the random access parameter and the total number of resources in the obtained resource list specifically includes:

performing a modulo operation for the serial number of the random access parameter in the first system information block in the random access parameter list and the total number of resources in the resource list, where the operation result indicates a default common enhanced dedicated channel resource corresponding to the random access parameter in the first system information block and the operation is expressed by using a formula X=SigInd mod Y, where X is a default common enhanced dedicated channel resource index, Y is the total number of resources in the resource list, and SigInd is the serial number of the random access parameter in the first system information block in the random access parameter list; or obtaining, according to a formula X=(SigInd+W) mod Y, a default common enhanced dedicated channel resource corresponding to the random access parameter in type 1, where:

SigInd is the serial number of the random access parameter in type 1 in the random access parameter list, W is the total number of random access parameters in the first system information block in the list, Y is the total number of resources in the resource list, and X is a default common enhanced dedicated channel resource index.

In an eighth possible implementation manner of the first aspect in the embodiments of the present invention, the random access parameter list includes a random access parameter in type 1 in a second system information block and a random access parameter in a first system information block; and a serial number of the random access parameter in the first system information block is larger than a serial number of the random access parameter in type 1; and the obtaining a mapping between the random access parameter and a common enhanced dedicated channel resource according to the obtained serial number of the random access parameter and the total number of resources in the obtained resource list specifically includes:

obtaining a mapping between the random access parameter in the first system information block and the common enhanced dedicated channel resource by using a formula X=SigInd mod Y, where:

X is a default common enhanced dedicated channel resource index, Y is the total number of resources in the resource list, SigInd is the serial number of the random access parameter in the first system information block in the random access parameter list, and mod is a modulo operation; or obtaining a mapping between the random access parameter in type 1 and the default common enhanced dedicated channel resource according to a formula X=(SigInd+W) mod Y, where:

SigInd is the serial number of the random access parameter in type 1 in the random access parameter list, W is the total number of random access parameters in the first system information block in the list, Y is the total number of resources in the resource list, X is a default common enhanced dedicated channel resource index, and mod is a modulo operation.

With reference to any one of the first to the eighth possible implementation manners of the first aspect in the embodiments of the present invention, the obtaining a random access parameter list specifically includes:

receiving a system broadcast message sent by a network side device, where the system broadcast message includes a random access parameter; and numbering, according to a sequence configured in the system broadcast message, the random access parameter serially, so as to obtain the random access parameter list.

With reference to any one of the first to the eighth possible implementation manners of the first aspect in the embodiments of the present invention, the first system information block is a system information block 5 SIB5 and the second system information block is a system information block 22 SIB22.

With reference to any one of the second to the sixth possible implementation manners of the first aspect in the embodiments of the present invention, the obtaining a list of a 2 ms common enhanced dedicated channel resource in the first system information block includes:

obtaining a list of all resources in the first system information block, and obtaining the list of the 2 ms common enhanced dedicated channel resource according to a start serial number of a 2 ms resource configured on a network side device.

A second aspect of embodiments of the present invention provides a method for obtaining a mapping between a random access parameter and a resource, where the method includes:

obtaining a serial number of a random access parameter, where the serial number of the random access parameter is an actual serial number of each parameter on a corresponding physical random access channel (PRACH);

obtaining a resource list; and the obtaining a mapping between the random access parameter and a common enhanced dedicated channel resource according to the obtained serial number of the random access parameter and the total number of resources in the obtained resource list specifically includes:

performing a modulo operation for the serial number of the random access parameter and the total number of resources in the resource list, where the operation result indicates a default common enhanced dedicated channel resource corresponding to the random access parameter and the operation is expressed by using a formula: X=SigInd mod Y, where:

X is a default common enhanced dedicated channel resource index, Y is the total number of resources in the resource list, and SigInd is an actual serial number of the random access parameter on a corresponding PRACH.

A third aspect of embodiments of the present invention provides an apparatus for obtaining a mapping between a random access parameter and a resource, where the apparatus includes:

a parameter list obtaining unit, a serial number obtaining unit, a resource list obtaining unit, and a mapping obtaining unit, where:

the parameter list obtaining unit is configured to obtain a random access parameter list;

the serial number obtaining unit is configured to obtain a serial number of a parameter in the random access parameter list;

the resource list obtaining unit is configured to obtain a resource list; and the mapping obtaining unit is configured to obtain a mapping between the random access parameter and a common enhanced dedicated channel resource in the resource list according to the obtained serial number of the random access parameter and the total number of resources in the obtained resource list, so that a network side determines, according to the random access parameter sent by a UE, whether a corresponding common enhanced dedicated channel resource is available.

In a first possible implementation manner of the third aspect in the embodiments of the present invention, the random access parameter list includes a random access parameter in a first system information block and a random access parameter in type 1 in a second system information block; and a serial number of the random access parameter in the first system information block is smaller than a serial number of the random access parameter in type 1;

the resource list obtaining unit is specifically configured to obtain a list of a common enhanced dedicated channel resource corresponding to a cell-level transmission time interval TTI in the first system information block; and the mapping obtaining unit is specifically configured to:

perform a modulo operation for the serial number of the parameter in the random access parameter list and the total number of resources in the resource list, where the operation result indicates a default common enhanced dedicated channel resource corresponding to the random access parameter and the operation is expressed by using a formula: X=SigInd mod Y, where:

X is a default common enhanced dedicated channel resource index, Y is the total number of resources in the resource list, and SigInd is the serial number of the parameter in the random access parameter list.

In a second possible implementation manner of the third aspect in the embodiments of the present invention, the random access parameter list includes a random access parameter in type 2 in a second system information block and a random access parameter in type 3 in the second system information block;

the resource list obtaining unit is specifically configured to obtain a list of a 2 ms common enhanced dedicated channel resource in a first system information block; and the mapping obtaining unit is specifically configured to:

perform a modulo operation for the serial number of the parameter in the random access parameter list and the total number of resources in the obtained list of the 2 ms common enhanced dedicated channel resource in the first system information block, where the operation result is used to indicate a default common enhanced dedicated channel resource corresponding to the random access parameter and the operation is expressed by using a formula: X'=SigInd mod Z, where:

X' is a default common enhanced dedicated channel resource index and is used to indicate a serial number of a resource in the list of the 2 ms common enhanced dedicated channel resource, Z is the total number of resources in the list of the 2 ms common enhanced dedicated channel resource in the first system information block, and SigInd is the serial number of the parameter in the random access parameter list.

In a third possible implementation manner of the third aspect in the embodiments of the present invention, the random access parameter list includes a random access parameter in type 2 in a second system information block and a random access parameter in type 3 in the second system information block;

the resource list obtaining unit is specifically configured to obtain a list that includes only a 2 ms common enhanced dedicated channel resource in a first system information block; and the mapping obtaining unit is specifically configured to:

perform a modulo operation for the serial number of the parameter in the random access parameter list and the total number of resources in the obtained list of the 2 ms common enhanced dedicated channel resource in the first system information block, where the operation result is expressed as (SigInd mod Z); and obtain, according to a formula X'=(Z−1)−(SigInd mod Z), a default common enhanced dedicated channel resource corresponding to the random access parameter, where:

X' is a default common enhanced dedicated channel resource index and is used to indicate a serial number of a resource in the list of the 2 ms common enhanced dedicated channel resource, Z is the total number of resources in the list of the 2 ms common enhanced dedicated channel resource in the first system information block, and SigInd is the serial number of the parameter in the random access parameter list.

In a fourth possible implementation manner of the third aspect in the embodiments of the present invention, the random access parameter list includes a random access parameter in type 2 in a second system information block;

the resource list obtaining unit is specifically configured to obtain a list of a 2 ms common enhanced dedicated channel resource in a first system information block; and the mapping obtaining unit is specifically configured to:

perform a modulo operation for the serial number of the parameter in the random access parameter list and the total number of resources in the obtained list of the 2 ms common enhanced dedicated channel resource in the first system information block, where the operation result is used to indicate a default common enhanced dedicated channel resource corresponding to the random access parameter and the operation is expressed by using a formula: X'=SigInd mod Z, or the operation is expressed by using a formula X'=(Z−1)−(SigInd mod Z), where:

X' is a default common enhanced dedicated channel resource index and is used to indicate a serial number of a resource in the list of the 2 ms common enhanced dedicated channel resource, Z is the total number of resources in the list of the 2 ms common enhanced dedicated channel resource in the first system information block, and SigInd is the serial number of the parameter in the random access parameter list.

In a fifth possible implementation manner of the third aspect in the embodiments of the present invention, the random access parameter list includes a random access parameter in type 3 in a second system information block;

the resource list obtaining unit is specifically configured to obtain a list of a 2 ms common enhanced dedicated channel resource in a first system information block; and the mapping obtaining unit is specifically configured to:

perform a modulo operation for the serial number of the parameter in the random access parameter list and the total number of resources in the obtained list of the 2 ms common enhanced dedicated channel resource in the first system information block, where the operation result is used to indicate a default common enhanced dedicated channel resource corresponding to the random access parameter and the operation is expressed by using a formula: X'=SigInd mod Z, or the operation is expressed by using a formula X'=(Z−1)−(SigInd mod Z), where:

X' is a default common enhanced dedicated channel resource index and is used to indicate a serial number of a resource in the list of the 2 ms common enhanced dedicated channel resource, Z is the total number of resources in the list of the 2 ms common enhanced dedicated channel resource in the first system information block, and SigInd is the serial number of the parameter in the random access parameter list; or obtain, by a corresponding user in the fourth possible implementation manner, a mapping between the random access parameter and the default common enhanced dedicated channel resource by using a formula X'=(Z−1)−(SigInd mod Z); and, obtain, by a corresponding user in the fifth possible implementation manner, a mapping between the random access parameter and the default common enhanced dedicated channel resource by using a formula X'=SigInd mod Z.

With reference to any one of the second to the fifth possible implementation manners of the third aspect in the embodiments of the present invention, the mapping obtaining unit is further configured to: obtain a corresponding serial number of the default common enhanced dedicated channel common E-DCH resource in the first system information block by using a formula X=X'+concurrent TTI partition index, where X is the corresponding serial number of the default common E-DCH resource in the first system information block, and the Concurrent TTI partition index is a start serial number of the 2 ms common E-DCH resource in the first system information block.

In a seventh possible implementation manner of the third aspect in the embodiments of the present invention, the random access parameter list includes four parts: a random access parameter in a first system information block, a random access parameter in type 1 in a second system information block, a random access parameter in type 2 in the second system information block, and a random access parameter in type 3 in the second system information block; or, the random access parameter list includes three parts: a random access parameter in a first system information block, a random access parameter in type 2 in a second system information block, and a random access parameter in type 3 in the second system information block; or, the random access parameter list includes only a random access parameter in type 1 in a second system information block; or, the random access parameter list includes a random access parameter in a first system information block and a random access parameter in type 2 in a second system information block; or, the random access parameter list includes a random access parameter in a first system information block and a random access parameter in type 3 in a second system information block; and the mapping obtaining unit is specifically configured to:

perform a modulo operation for the serial number of the parameter in the random access parameter list and the total number of resources in the resource list, where the operation result indicates a default common enhanced dedicated channel resource corresponding to the random access parameter and the operation is expressed by using a formula: X=SigInd mod Y, where:

X is a default common enhanced dedicated channel resource index, Y is the total number of resources in the resource list, and SigInd is the serial number of the parameter in the random access parameter list.

In an eighth possible implementation manner of the third aspect in the embodiments of the present invention, the random access parameter list includes a random access parameter in type 1 in a second system information block and a random access parameter in a first system information block; and a serial number of the random access parameter in the first system information block is larger than a serial number of the random access parameter in type 1; and the mapping obtaining unit is specifically configured to:

perform a modulo operation for the serial number of the random access parameter in the first system information block in the random access parameter list and the total number of resources in the resource list, where the operation result indicates a default common enhanced dedicated channel resource corresponding to the random access parameter in the first system information block and the operation is expressed by using a formula X=SigInd mod Y, where X is a default common enhanced dedicated channel resource index, Y is the total number of resources in the resource list, and SigInd is the serial number of the random access parameter in the first system information block in the random access parameter list; or obtain, according to a formula X=(SigInd+W) mod Y, a default common enhanced dedicated channel resource corresponding to the random access parameter in type 1, where:

SigInd is the serial number of the random access parameter in type 1 in the random access parameter list, W is the total number of random access parameters in the first system information block in the list, Y is the total number of resources in the resource list, and X is a default common enhanced dedicated channel resource index.

With reference to any one of the first to the eighth possible implementation manners of the third aspect in the embodiments of the present invention, in an eighth possible implementation manner of the third aspect in the embodiments of the present invention, the parameter list obtaining unit includes a receiving unit and a numbering unit, where:

the receiving unit is configured to receive a system broadcast message sent by a network side device, where the system broadcast message includes a random access parameter; and the numbering unit is configured to number, according to a sequence configured in the system broadcast message, the random access parameter serially, so as to obtain the random access parameter list.

With reference to any one of the second to the sixth possible implementation manners of the third aspect in the embodiments of the present invention, the resource list obtaining unit is specifically configured to obtain a list of all resources in the first system information block, and obtain the list of the 2 ms common enhanced dedicated channel resource according to a start serial number of a 2 ms resource configured on a network side device.

A fourth aspect of embodiments of the present invention provides an apparatus for obtaining a mapping between a random access parameter and a resource, where the apparatus includes:

a first obtaining unit, a second obtaining unit, and a third obtaining unit, where:

the first obtaining unit is configured to obtain a serial number of a random access parameter, where the serial number of the random access parameter is an actual serial number of each parameter on a corresponding physical random access channel (PRACH);

the second obtaining unit is configured to obtain a resource list; and the third obtaining unit is configured to perform a modulo operation for the serial number of the random access parameter and the total number of resources in the resource list, where the operation result indicates a default common enhanced dedicated channel resource corresponding to the random access parameter and the operation is expressed by using a formula: X=SigInd mod Y, where:

X is a default common enhanced dedicated channel resource index, Y is the total number of resources in the resource list, and SigInd is an actual serial number of the random access parameter on a corresponding PRACH.

Embodiments of the present invention provide a method and an apparatus for obtaining a mapping between a random access parameter and a resource, in the technical solution, a random access parameter list is obtained, and a serial number of a random access parameter is obtained; a UE obtains a resource list and can obtain a mapping between the random access parameter and a default enhanced dedicated channel resource according to the serial number of the random access parameter and the number of resources in the obtained resource list; and in a case that there is more than one PRACH, a solution of obtaining a mapping between the random access parameter and the default enhanced dedicated channel resource is provided, thereby optimizing a random access process and improving random access efficiency. After a network side device determines a mapping manner between the random access parameter (that is, a signature and a PRACH) and a default common E-DCH resource according to this solution, the UE initiates a random access process after selecting a random access parameter; a NodeB can determine, according to a detected signature and PRACH, a resource that the UE wants to obtain, and grants the resource by using an AI; and if the resource has already been occupied, the NodeB can indicate another unoccupied resource by using an enhanced acquisition indicator (EAI).

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Before the embodiments of the present invention are described in detail, it should be first understood that a UE in a non-dedicated connection state can obtain, only through a random access process, a resource for sending uplink data. Before performing a random access operation, the UE has already obtained a random access parameter list by reading a system broadcast message sent by a network side device and obtained a serial number of a random access parameter. In addition, the UE can obtain a common E-DCH resource list and can obtain, according to the serial number of the random access parameter and the total number of resources in the obtained resource list, a mapping between the random access parameter and a default enhanced dedicated channel resource. a random access parameter (that is, a signature and a PRACH) required for access is selected during random access of the UE. In this case, the UE sends a selected signature on a selected PRACH channel, where the signature may correspond to a default enhanced dedicated channel resource, that is, a resource that the UE needs to compete for and is used to transmit data in the non-dedicated connection state; the network side device may learn, according to the signature sent by the UE, an index of the default enhanced dedicated channel resource that the UE needs to complete for, and determines whether the default enhanced dedicated channel resource is occupied; if the resource is not occupied, the resource is allocated to the UE; and if the resource has already been occupied, the UE is notified of a competition failure or another available resource is indicated to the UE by using an EAI.

Figure 1A:
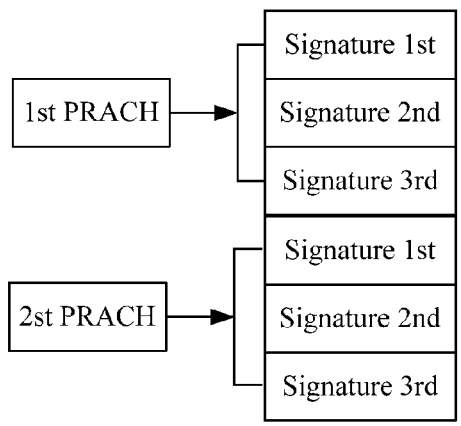
FIG. 1a is a diagram showing a mapping between random access parameters PRACHs and signatures that can be selected in a UE according to an embodiment of the present invention.

For better understanding of the technical solutions provided in the embodiments of the present invention, the following gives a necessary description about an existing specification in this technical field:

The signature and the PRACH in the embodiments of the present invention may be understood as a corresponding signature selected on a selected PRACH channel. As shown in FIG. 1a, a UE may select a first PRACH (which may also be represented as PRACH1) or may select a second PRACH (which may also be represented as PRACH2), where PRACH1 currently includes three signatures and PRACH2 currently includes three signatures. In the prior art, each PRACH supports a maximum of 16 signatures. As shown in FIG. 1a, the number of PRACHs and the number of signatures are examples for ease of understanding other than a limitation on the embodiments of the present invention. Subsequent descriptions of numbers in the specification are examples for ease of understanding other than a limitation on the embodiments of the present invention.

The signature and the PRACH, as random access parameters, can be used to indicate a type of a resource accessed by the UE and a capability supported by the UE. The type of resource accessed by the UE generally includes two types: a 10 millisecond (ms) transmission time interval (TTI) and a 2 ms TTI. With the development of current technologies, the PRACH and the signature are classified into five types according to the capability of the UE and the type of resource that the UE wants to compete for:

First type of signature and PRACH: Used by the UE to compete for an R99 PRACH resource to transmit uplink data. The configuration information is included in the 10.3.6.55 protocol PRACH system information list (25.331).

Figure 1B:
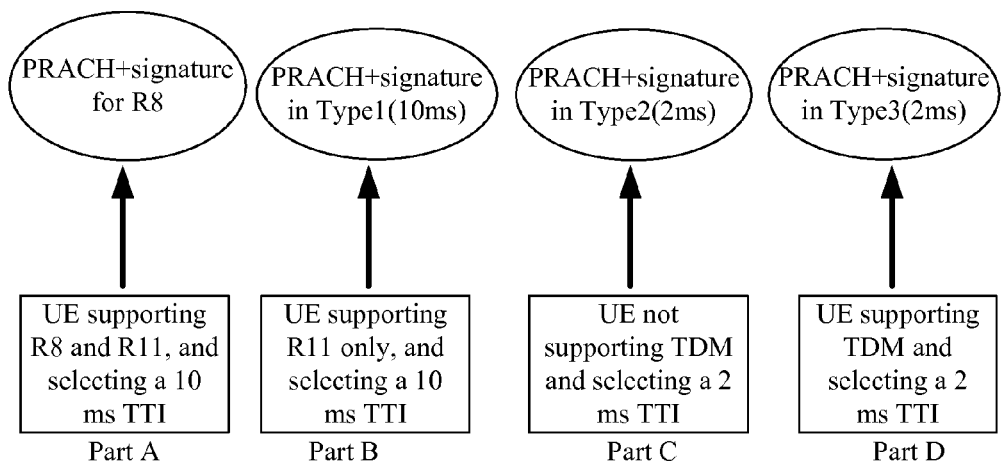
FIG. 1b is a schematic diagram showing a mapping between a UE capability and a random access parameter according to an embodiment of the present invention.

Second type of signature and PRACH: Used by a UE that supports a common E-DCH feature and a UE that supports a part of FE-FACH features to compete for a common E-DCH resource to transmit uplink data, where the type of the common E-DCH resource competed for by the UE supporting a part of the FE-FACH feature is a type of a resource corresponding to a cell-level TTI. The configuration information is included in the PRACH preamble control parameters (for enhanced uplink) 10.3.6.54a protocol (PRACH preamble control parameters (for Enhanced Uplink) 10.3.6.54a). As shown in part A of FIG. 1b, the UE supports the common E-DCH feature and a part of FE-FACH sub-features, and a required resource type is a 10 ms TTI. The common E-DCH feature is introduced in R8, and therefore a UE of R8 is used to indicate the UE that supports the common E-DCH feature; while the FE-FACH feature is introduced in R11, and therefore in FIG. 1b, an UE of R11 is used to indicate the UE that supports the FE-FACH feature. It cannot be excluded that a UE of a version later than R8 or R11 may also support the common E-DCH feature or the FE-FACH feature. R8 and R11 herein represent only a version in which a feature is introduced, but do not represent an actual version of the UE. Part A in FIG. 1b represents that a UE of R8 or a UE of R11 selecting a 10 ms TTI selects a PRACH and a signature that are configured for the UE of R8. FIG. 1b is only an example, and in this example, the cell-level TTI of 10 ms is used as an example for description.

Third type of signature and PRACH: Used by a UE that supports a part of FE-FACHs to compete for a 10 ms common E-DCH resource to send a signature and a PRACH corresponding to uplink data. The configuration information is included in the PRACH preamble control parameters extension list for type 1 (for enhanced uplink) 10.3.6.b10 protocol (PRACH preamble control parameters extension list for Type 1 (for Enhanced Uplink) 10.3.6.b10). As shown in part B of FIG. 1b, the UE supports only a part of FE-FACH sub-features, and the UE selects a 10 ms TTI resource type. In this case, a corresponding parameter is included in Type1 of a system information block (SIB, System Information Block) 22. If the UE meeting a requirement performs random access, the UE selects a parameter corresponding to Type1 in the SIB22.

Fourth type of signature and PRACH: Used by a UE that selects a 2 ms TTI resource type and meanwhile does not support a per hybrid automatic repeat request (per HARQ) feature and/or a TTI alignment feature to compete for a 2 ms common E-DCH resource to transmit uplink data; and used by the UE to inform the network side device that the UE does not support the per HARQ and/or the TTI alignment feature. The configuration information is included in the PRACH preamble control parameters extension list type 2 (for Enhanced Uplink) 10.3.6.b9 protocol (PRACH preamble control parameters extension list Type 2 (for Enhanced Uplink) 10.3.6.b9). As shown in part C of FIG. 1b, the UE does not support time division multiplexing (TDM, that is, the per HARQ and the TTI alignment), and the UE selects a TTI whose resource type is 2 ms. When initiating random access, the UE of this type selects a signature and a PRACH that are configured in Type3.

Fifth type of signature and PRACH: Used by a UE that supports the per HARQ and the TTI alignment feature and has selected a 2 ms TTI resource type to compete for a 2 ms common E-DCH resource to transmit uplink data and also used by the UE to inform the network side that the UE supports the per HARQ and the TTI alignment features. The configuration information is included in the PRACH preamble control parameters extension list type 3 (for Enhanced Uplink) 10.3.6.b9 protocol (PRACH preamble control parameters extension list Type 3 (for Enhanced Uplink) 10.3.6.b9). As shown in part C of FIG. 1b, the UE supports time division multiplexing (TDM, that is, the per HARQ and the TTI alignment). If the UE selects a TTI whose resource type is 2 ms, the UE selects a signature and a PRACH that are configured in Type3 to perform random access.

The foregoing E-DCH resource and common E-DCH resource are resources that are obtained by the UE through competition after the UE performs the random access and are used to transmit data in a non-dedicated connection state. The resource in the embodiments of the present invention is described by using the common E-DCH resource as an example. In a case that an E-DCH resource is used, the common E-DCH resource may be replaced for implementation.

The technical solutions provided in the embodiments of the present invention, a mapping between a random access parameter (that is, a signature and a PRACH) and a default common E-DCH resource is determined based on specifications of the foregoing second type to the fifth type, so that a signature and a PRACH can correspond to a default common E-DCH resource properly, thereby reducing a probability of a conflict that occurs when a network side device allocates a resource to different UEs, and avoiding a case that the UE cannot perform data transmission correctly when the UE wants to compete for a 2 ms resource during selecting of some signatures and PRACHs, but actually obtains a 10 ms resource.

The following describes the technical solutions provided in the embodiments of the present invention in detail with reference to embodiments.

Embodiment 1

Figure 2:
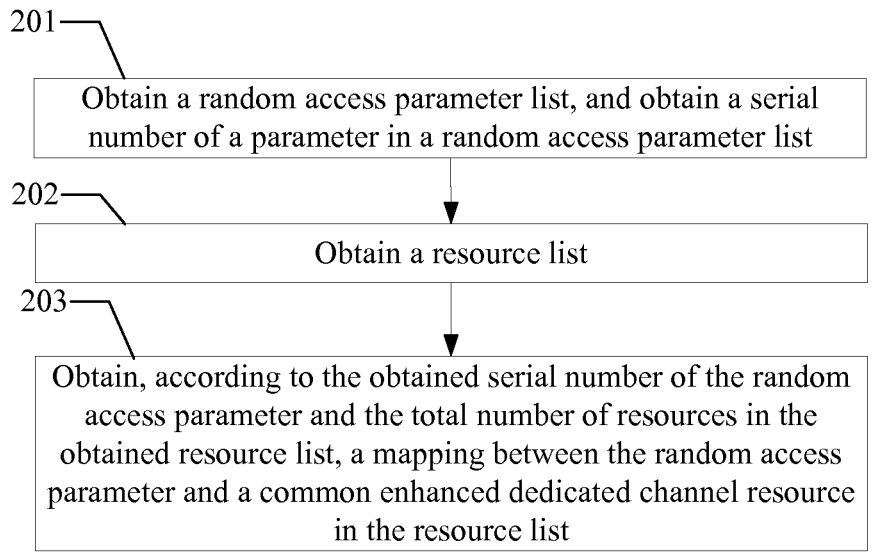
FIG. 2 is a flowchart of a method for obtaining a mapping between a random access parameter and a resource according to method Embodiment 1 of the present invention.

This embodiment of the present invention provides a method for obtaining a mapping between a random access parameter and a resource. As shown in FIG. 2, the method includes:

Step 201: Obtain a serial number of a parameter in a random access parameter list.

Further, before step 201, the random access parameter list may be first obtained, and then the serial number of the parameter is obtained from the random access parameter list. A UE may also obtain the serial number of the parameter in the random access parameter list directly. This embodiment of the present invention does not make any limitation on maintenance of the random access parameter list. For better ease of illustration, the following describes an example of a method for implementing, by the UE, maintenance of the random access parameter list, which specifically includes:

After the UE is powered on, the UE may receive a system broadcast message sent by a network side device, where the system broadcast message includes a parameter (called "random access parameter") that needs to be used by the UE in a process of performing random access; the UE records, according to a sequence of the random access parameter configured in the system broadcast message, a received random access parameter to create a random access parameter list, where a serial number of each item in the list is numbered serially and according to a sequence configured in a system information block (SIB). In this embodiment, each item in the list is numbered serially and mainly according to a sequence configured in a first system information block and/or a second system information block. The first system information block is a system information block that includes a common E-DCH resource, for example, it may be a SIB5 or an extended system information block. The second system information block includes a random access parameter of a UE that supports an FE-FACH feature, for example, it may be a SIB22 or an extended system information block. The following uses only the SIB5 and the SIB22 as an example. The second system information block may include at least one of the following configuration types, for example, type 1 (Type1), type 2 (Type2), type 3 (Type3) or an extended type. The following uses only type 1, type 2, and type 3 in the second system information block as an example.

According to different capabilities (or versions) of the UE, after the UE is powered on, a parameter obtained from the system broadcast message may also be different. For details, reference is made to the following example.

For example, for a UE that supports a Common E-DCH feature, if the network side device also supports the Common E-DCH feature, a parameter obtained by the UE is included in 10.3.6.54a of the 25.331 protocol, for example, the following Table 1 lists PRACHs and signatures included in the protocol.

first system information block; serial number 3 indicates Signature1 and PRACH2 in type 1 (Type1) of the SIB22, serial number 4 indicates Signature2 and PRACH2 in type 1 (Type)) of the SIB22, and serial number 5 indicates Signature3 and PRACH2 in type 1 (Type)). In this case, the list created by the UE is shown in the following Table 2:

TABLE 2

| 0 | Signature 1 + PRACH 1 in SIB5 |
|---|---|
| 1 | Signature 2 + PRACH 1 in SIB5 |
| 2 | Signature 3 + PRACH 1 in SIB5 |
| 3 | Signature 1 + PRACH 2 in Type1 |
| 4 | Signature 2 + PRACH 2 in Type1 |
| 5 | Signature 3 + PRACH 2 in Type1 |

A numbering sequence in the list shown in Table 2 is from 0 to 5. This numbering sequence is only an example for ease of understanding and does not limit this embodiment of the

TABLE 1

| Information Element/ Group name | Need | Multi | Type and reference | Semantics description | Information Element/ Group name |
|---|---|---|---|---|---|
| Available signature | MD | | Bit string(16) | The default value is the inverse of the bitstring indicated in the IE "Available Signature" in the IE "PRACH Info (for RACH)". Each bit indicates availability for a signature. Each bit indicates availability for a signature. Each available signature on the AICH is associated with one Common E-DCH Resource Configuration in the "Common E-DCH resource configuration information list". | Available signature |
| E-AI Indication | MP | | BOOLEAN | TRUE: E-AIs are in use on the AICH. FALSE: E-AIs are not in use on the AICH. | E-AI Indication |
| Preamble scrambling code number | MD | | Integer (0 . . . 15) | The default value is the value number indicated in the IE "Preamble Scrambling code" in "PRACH Info (for RACH)". Identification of scrambling code, see [28]. | Preamble scrambling code number |

In the foregoing Table 1, according to a specification of the Common E-DCH feature, that is, an available signature and a preamble scrambling code number in the specification, the UE obtains a signature and a PRACH according to the received system broadcast message. A sequence of the signature and the PRACH in the list is a sequence that is already configured in the system broadcast message by the network side device. The UE may obtain a list of the signature and the PRACH and each item of the list is obtained and numbered serially. For example, each signature and each PRACH in the system broadcast message received by the UE are configured in the following sequence: serial number 0 indicates Signature1 and PRACH1 in the first system information block, serial number 1 indicates Signature2 and PRACH1 in the first system information block, serial number 2 indicates Signature3 and PRACH1 in the present invention. The foregoing PRACH1 and PRACH2 are only used to differentiate PRACH channels, and 1 and 2 do not represent code channels of the PRACH channels. The foregoing PRACH1 and PRACH2 may be a same PRACH channel or different PRACH channels, which is not limited in this embodiment of the present invention. PRACH1, PRACH2, and the like should be understood in a same manner in this specification.

For another example, for a UE that supports the FE-FACH feature, the UE is capable of identifying access parameters of the SIB5 and the SIB22, where the parameters are included in a PRACH preamble control parameters extension list for Type 1 (for Enhanced Uplink), a PRACH preamble control parameters extension list Type 2 (for Enhanced Uplink), and a PRACH preamble control parameters extension list Type 3 (for Enhanced Uplink) (PRACH preamble control parameters extension list for Type 1 (for Enhanced Uplink), PRACH preamble control parameters extension list Type 2 (for Enhanced Uplink), PRACH preamble control parameters extension list Type 3 (for Enhanced Uplink)). According to the 10.3.6.b12 protocol, a format of the signature and the PRACH parameters in Type 1 configured by the network side device and obtained by the UE is listed in the following Table 3:

TABLE 3

| Information Element/Group Name | Need | Multi | Type and Reference | Semantics Description | Version |
|---|---|---|---|---|---|
| PRACH preamble control parameters list (for Enhanced Uplink) | MP | 1 to <maxPRACH_EUL> | | | REL-11 |
| >PRACH preamble control parameters extension (for Enhanced Uplink) | MP | | PRACH preamble control parameters extension (for Enhanced Uplink) 10.3.6.b12 | Control parameters of the physical signal. | REL-11 |

TABLE 4

| Information Element/ Group Name | Need | Multi | Type and Reference | Semantics Description | Version |
|---|---|---|---|---|---|
| Available Signature | MP | | Bit string(16) | Each bit indicates availability for a signature. Each available signature on the AICH is associated with one Common E-DCH Resource Configuration in the "Common E-DCH resource configuration information list". | REL-11 |
| Preamble scrambling code number | MP | | Integer (0 ... 15) | Identification of scrambling code, see [28]. | REL-11 |

Table 3 and Table 4 are explained in the same manner as Table 1, and a difference only lies in specific rules of different specific protocols, which is not repeatedly described herein.

It should also be understood that the random access parameter may include the signature and the PRACH and may also include other information such as an access timeslot.

Step 202: Obtain a resource list, where a serial number in the obtained resource list is subsequently used in step 203. This embodiment of the present invention does not limit maintenance of the resource list.

Step 203: Obtain a mapping between the random access parameter and a common enhanced dedicated channel resource (common E-DCH resource) in the resource list according to the obtained serial number of the random access parameter and the total number of resources in the obtained resource list.

After obtaining the mapping, the UE may send the random access parameter to the network side device, so that the network side device determines, according to the random access parameter sent by the UE, whether a common E-DCH resource that the UE competes for and a corresponding common enhanced dedicated channel resource are available.

The common enhanced dedicated channel resource corresponding to the random access parameter may be called a default common enhanced dedicated channel resource. In this method, a corresponding operation is performed for the serial number in the random access parameter list and the total number of resources in the resource list to obtain a default common enhanced dedicated channel resource index, where the default common E-DCH resource index is used to indicate a default common E-DCH resource.

This embodiment of the present invention provides a method for obtaining a mapping between a random access parameter and a resource. A UE obtains a resource list by obtaining a random access parameter list and obtaining a serial number of a random access parameter, and can obtain a mapping between the random access parameter and a default enhanced dedicated channel resource according to the serial number of the random access parameter and the total number of resources in the obtained resource list. After a network side device determines a mapping manner between the random access parameter (that is, a signature and a PRACH) and a default common E-DCH resource according to this solution, the UE initiates a random access process after selecting a random access parameter; a NodeB can determine, according to a detected signature and PRACH, a resource that the UE wants to obtain, and grants the resource by using an AI; and if the resource has already been occupied, the NodeB can indicate another unoccupied resource by using an EAI.

Embodiment 2

Figure 3:
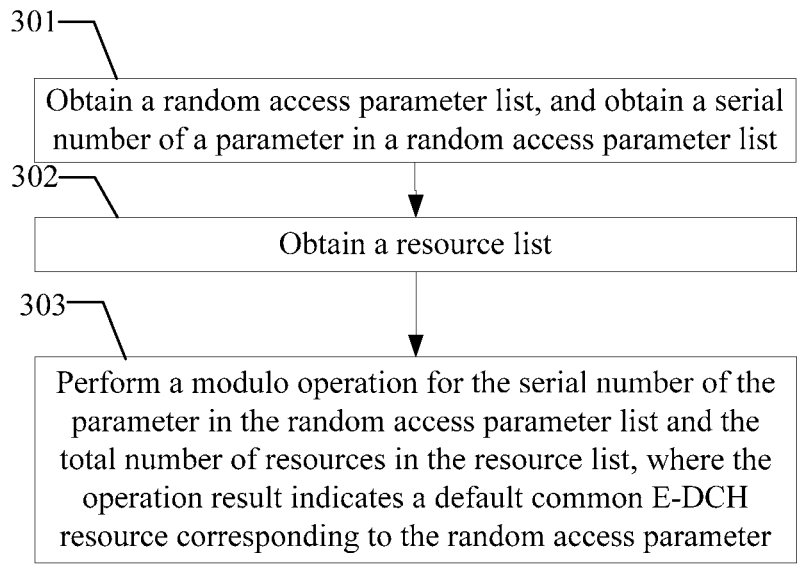
FIG. 3 is a flowchart of a method for mapping a random access parameter to a resource according to method Embodiment 2 of the present invention.

This embodiment of the present invention provides a method for obtaining a mapping between a random access parameter and a resource. In this embodiment, a resource type selected by a UE is a 10 ms TTI, and the UE supports a common E-DCH feature; or the UE supports some FE-FACH sub-features and selects a 10 ms resource, and obtained configurations are a configuration of a first system information block and a configuration of Type1 in a second system information block. Optionally, the first system information block is a SIB5. The second system information block is a SIB22. As shown in FIG. 3, the method includes:

Step 301: Obtain a random access parameter list, and obtain a serial number of a parameter in the random access parameter list, where the random access parameter list includes a random access parameter in a first system information block and a random access parameter in Type1 in a second system information block, and a serial number of the random access parameter in the first system information block recorded in the random access parameter list is smaller than a serial number of the random access parameter in the second system information block.

In this case, it is considered that an E-DCH transmission time interval in the first system information block is 10 ms, that is, the whole cell-level TTI is 10 ms, and a TTI of 10 ms is configured for a cell.

The following Table 5 shows the random access parameter list obtained by the UE and a serial number of each item in the list, where a sequence of the serial number in the list obtained by the UE may be from 0 to N−1, which is numbered by the UE for a sequence of the obtained random access parameter after the network side device delivers the random access parameter.

TABLE 5

| | |
|---|---|
| 0 | Signature 1 + PRACH 1 in SIB5 |
| 1 | Signature 2 + PRACH 1 in SIB5 |
| ... | ... |
| ... | Signature A + PRACH 1 in SIB5 |
| ... | Signature 1 + PRACH2 in Type1 |
| N-2 | ... |
| N-1 | Signature B + PRACHC in Type1 |

As shown in Table 5, a TTI type of a resource needed by the UE is 10 ms and the UE is allowed to use a parameter in Type1. The UE numbers, according to the obtained random access parameter (as shown in Table 5), a parameter in the first system information block and a parameter in Type1 in the second system information block delivered by the network side device serially, the foregoing parameters after the UE receives the foregoing parameters. In this embodiment of the present invention, a numbering entity is not limited to the UE, and it may also be another device, but the UE is capable of obtaining the sequence of the serial number in the list. For example, access parameters Signature 1 and PRACH 1 in SIB5 that are obtained by the UE are numbered 0, or access parameters Signature B and PRACH2 in Type1 that are obtained by the UE are numbered N−1 (where N is an integer starting from 0). N is the total number of parameters in the random access parameter list. For different random access parameter lists, the total number of parameters may be different, that is, a value of N may be different. In each subsequent embodiment, the total number of parameters in the random access parameter list is represented by N, but a specific value of N may be different. This is not repeatedly described in each subsequent embodiment.

It should also be understood that the first system information block has only one PRACH channel, that is, the first PRACH in Table 5, and A is the number of signatures on a corresponding PRACH channel in the first system information block, which can be used by the UE to compete for a common E-DCH resource. B is the number of available signatures on the $C^{th}$ PRACH channel in Type 1. The foregoing PRACH 1, PRACH2, and PRACH3 are numbered in a sequence in which the PRACH channels appear in the SIB. 1, 2, and 3 represent only a configured sequence of the PRACH channels and are not actual channel code values. In addition, 1, 2, and 3 may correspond to a same channel code, and they have the same meaning in this specification and are not repeatedly described subsequently.

A and B in Table 5 are integers greater than 0 and less than or equal to 16, and C is an integer greater than 0.

Step 302: Obtain a resource list, where the obtained resource list may include a list of a common enhanced dedicated channel resource corresponding to a cell-level transmission time interval TTI in the first system information block.

For example, when the cell-level transmission time interval is 10 ms and the UE selects a TTI of 10 ms, all resources in a current cell are available. Therefore, a set of resources of the UE include all resources in the first system information block. The UE obtains a list of all resources in the first system information block, and the UE may learn, from this list, a sequence of the resources in the first system information block.

The following Table 6 shows the sequence of the resources in the first system information block, that is, a serial number (or called "resource index" (Resource index)) of each item in the resource list, where the serial number is an integer starting from 0, that is, 0, 1, 2, ... , Y−1, where Y is the total number of E-DCH resources in the cell for enhanced uplink access in a Cell_FACH state and an idle state and may also be understood as the total number of resources in the first system information block. In this embodiment of the present invention, a resource serial number of a resource is not limited to starting from 0. It may also start from another number.

TABLE 6

| |
|---|
| Resource index = 0 |
| Resource index = 1 |
| Resource index = 2 |
| ... |
| Resource index = Y-2 |
| Resource index = Y-1 |

Step 303: Obtain, according to the obtained code number of the random access parameter and the total number of resources in the obtained resource list, a mapping between the random access parameters and common enhanced dedicated channel resources, which specifically includes:

performing a modulo operation for the serial number of the parameter in the random access parameter list and the total number of resources in the resource list, where the operation result indicates a default common E-DCH resource corresponding to the random access parameter.

In this embodiment of the present invention, the foregoing operation result may be called a default common E-DCH resource index, where the index may embody the common E-DCH resource corresponding to the random access parameter, and the corresponding common E-DCH resource is used as the default common E-DCH resource of the random access parameter.

For details about understanding of the foregoing step 303, reference may be made to the following formula (2), that is:

$$X = \text{SigInd} \bmod Y \qquad (2)$$

where: X is the default Common E-DCH resource index; Y is the total number of E-DCH resources in the cell for enhanced uplink access in a CELL_FACH state and an idle state, that is, the total number of resources in the obtained resource list; SigInd is the serial number of the parameter in the random access parameter list, that is, the $S^{th}$ signature and PRACH in the cell allocated for the enhanced uplink access, that is, a serial number of each item in the foregoing random access parameter list, which starts from 0.

Figure 4A:
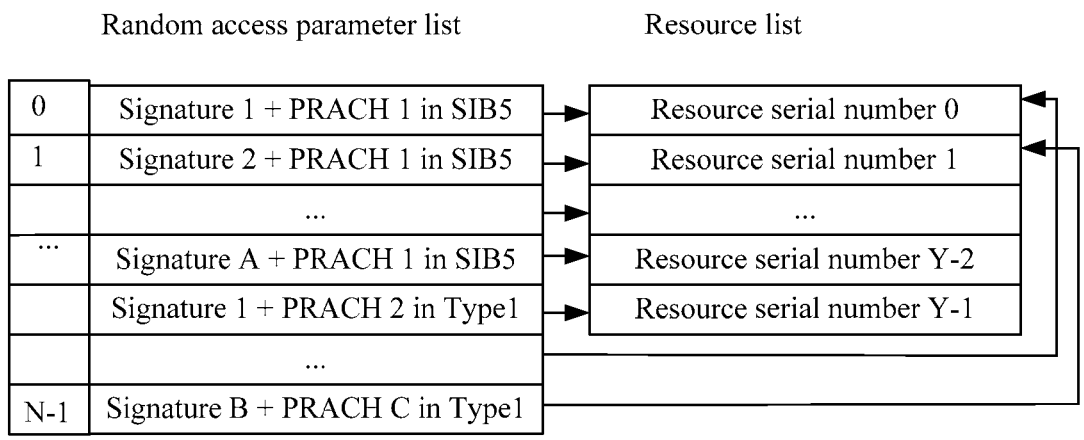
FIG. 4a is a schematic diagram of a mapping between a random access parameter and a default Common E-DCH resource obtained in method Embodiment 2 of the present invention.
Figure 4B:
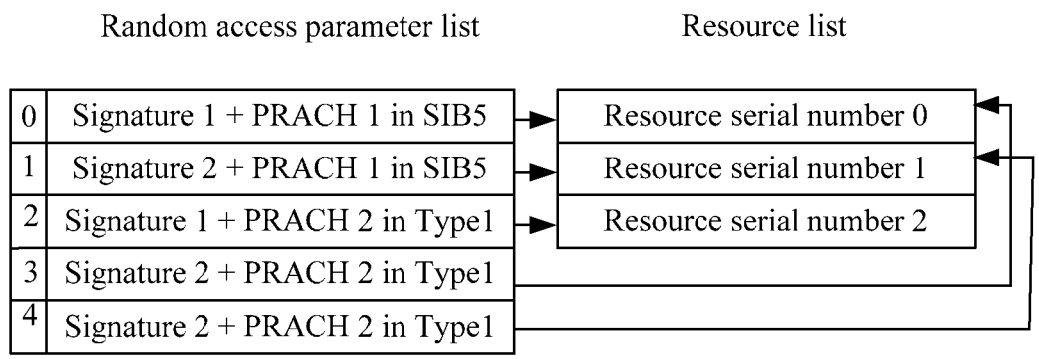
FIG. 4b is a schematic diagram showing a specific numeric example of a mapping between a random access parameter and a default Common E-DCH resource obtained in method Embodiment 2 of the present invention.

In the foregoing calculation formula, when the number of signatures and PRACHs included in the resource list is greater than the number of resources, remaining signatures and PRACHs correspond to the resources starting from the first resource subsequently. As shown in FIG. 4a, after the modulo operation is performed according to the formula (2), a default E-DCH resource index X is obtained, and a resource with the serial number same as X in the resource list is used as a resource corresponding to the signature, that is, the default E-DCH resource. Arrows in FIG. 4a represent a process of obtaining the mapping between the random access parameter and the common enhanced dedicated channel resource. Similar arrows in the following figures have the same meaning. The following is an example for better ease of understanding of FIG. 4a and the step 303. For example, if N is 5 and Y is 3, values of X according to the formula (2) include: X=0 mod 3=0, X=1 mod 3=1, X=2 mod 3=2, X=3 mod 3=0, and X=4 mod 3=1. As shown in FIG. 4b, when the number of signatures and PRACHs included in the resource list is greater than the number of resources, remaining signatures and PRACHs correspond to the resources starting from the first resource again. Specific values and operation results in FIG. 4b are examples for better understanding other than limit this embodiment of the present invention.

The foregoing describes a method for obtaining a mapping between a random access parameter and a resource provided in Embodiment 1 of the present invention. In this method, a resource list and a serial number of a resource in the list are obtained by obtaining a random access parameter list and the serial number in the list, obtaining; and a modulo operation is performed for a serial number of a random access parameter in the random access parameter list and the total number of resources in the obtained resource list, and the operation result is used as a default E-DCH resource index. This method can implement a solution of defining a corresponding default E-DCH resource after a signature and a PRACH are further divided.

Embodiment 3

This embodiment of the present invention provides a method for obtaining a mapping between a random access parameter and a resource. In this method, a resource type selected by a UE is a 2 ms TTI, and configurations obtained by the UE from a network side device are configurations of type 2 (Type2) and type 3 (Type3) in a second system information block, or it may also be understood that only configurations of type 2 and type 3 in a second system information block are read on the UE side. Optionally, the second system information block is a SIB22. The method includes:

Step 401: Obtain a random access parameter list, and obtain a serial number of a parameter in the random access parameter list, where the random access parameter list includes a random access parameter in Type2 and a random access parameter in Type3 in a second system information block. The following Table 7 shows the random access parameter list obtained by the UE and a serial number of each item in the list.

TABLE 7

| 0 | Signature 1 + PRACH 1 in Type2 |
| 1 | Signature 2 + PRACH 1 in Type2 |
| ... | ... |
| ... | Signature A + PRACH B in Type2 |
| ... | Signature 1 + PRACH1 in Type3 |
| N-2 | ... |
| N-1 | Signature C + PRACHD in Type3 |

The TTI type selected by the UE is 2 ms. The network side device has already numbered the random access parameters in Type2 and Type3 serially. After reading the random access parameters of the network side device, the UE obtains a random access parameter list according to the numbered random access parameters of the network side device. As shown in Table 7, parameters Signature 1 and PRACH 1 in Type2 are numbered 0, and parameters Signature C and PRACHD in Type3 are numbered N−1. N is an integer starting from 0.

A and C in Table 7 are integers greater than 0 and less than or equal to 16, and B and D are integers greater than 0.

It should be understood that the foregoing Table 7 may not be executed by the UE, and for ease of understanding, the foregoing is only a manner implemented by the UE and does not limit this embodiment of the present invention.

Step 402: Obtain a list of a 2 ms common E-DCH resource in a first system information block; optionally, the first system information block is a SIB5.

Figure 5A:
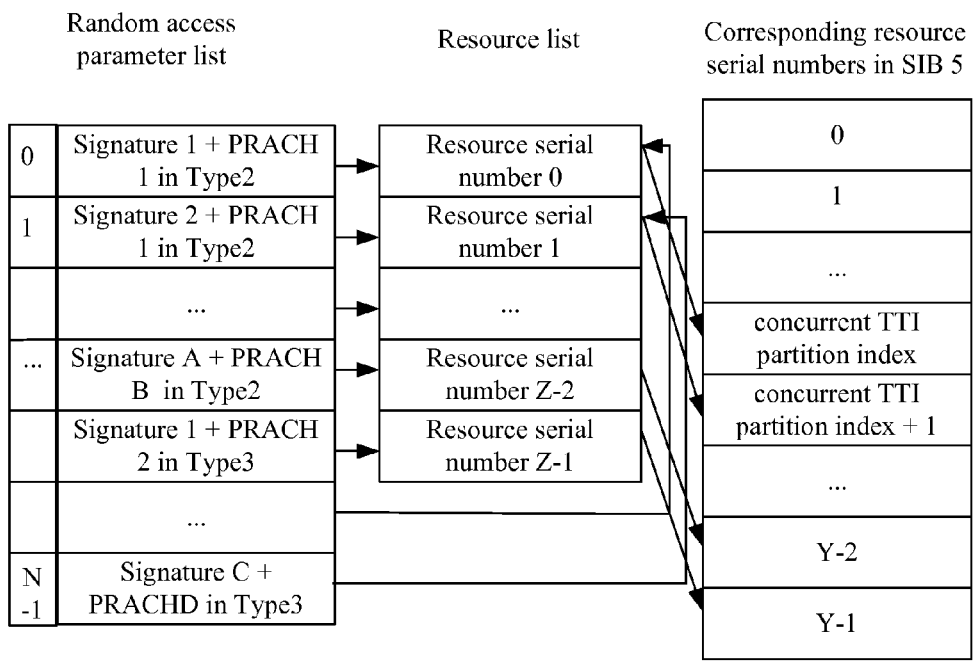
FIG. 5a is a schematic diagram of a mapping between a random access parameter and a default Common E-DCH resource obtained in method Embodiment 3 of the present invention.

The resource list obtained in step 402 may be a second list in FIG. 5a. Each resource in the second list is numbered serially, starting from 0, and a serial number of each source is an index of the resource in the resource list. A specific serial number of a resource is a serial number of a corresponding resource number in the first system information block. When the UE selects random access parameters in Type2 and Type3, default E-DCH resources corresponding to the random access parameters in Type2 and Type3 may be resources that are numbered and arrange after a concurrent TTI partition index (Concurrent TTI partition index) in the resource list. In other words, the Concurrent TTI partition index is a start serial number of the 2 ms common E-DCH resource in the first system information block and is configured by the network side device. The following Table 8 shows serial numbers of resources in the SIB5:

TABLE 8

Resource index = 0
Resource index = 1
Resource index = 2
...
Resource index = Concurrent TTI partition index
Resource index = Concurrent TTI partition index + 1
...
Resource index = Y-2
Resource index = Y-1

As shown in Table 8, the number Z of available 2 ms common E-DCH resources in the first system information block can be represented by using a difference between the total number Y of common E-DCH resources in the first system information block and a concurrent TTI partition index (Concurrent TTI partition index), as shown in the following formula (3):

$$Z = Y - \text{Concurrent TTI partition index} \quad (3)$$

Optionally, the list of the 2 ms common E-DCH resource in the first system information block obtained by the UE may be the list of common E-DCH resources supporting 2 ms shown in Table 8 rather than the whole list in Table 8. Optionally, the list of the 2 ms common E-DCH resource in the first system information block obtained by the UE may also be the whole list in Table 8, and the UE identifies the 2 ms common E-DCH resource in this list, which is called the list of the 2 ms common E-DCH resource. In subsequent embodiments, an obtained list of a 2 ms common E-DCH resource in a first system information block has the same meaning, which is not repeatedly described in subsequent embodiments.

Step 403: Perform a modulo operation for the serial number of the parameter in the random access parameter list and the number of obtained available 2 ms common E-DCH resources, where the sum of the operation result and the concurrent TTI partition index is used to indicate a default common E-DCH resource corresponding to the random access parameter.

For details about understanding of the foregoing step 403, reference may be made to the following formula (4), that is:

$$X' = \text{SigInd} \bmod Z \quad (4);$$

where X' is a default Common E-DCH resource index and is used to indicate a serial number of a resource in the list of the 2 ms common E-DCH resource, which is numbered from 0. Z is the number of 2 ms common E-DCH resources available for enhanced uplink access in the cell in a CELL_FACH state and an idle state, which is called the total number of resources in the list of the 2 ms common E-DCH resource in the first system information block. SigInd is the serial number of the parameter in the random access parameter list, that is, the $S^{th}$ signature (that is, serial numbers of the signature and the PRACH in Table 7) in the foregoing random access parameter list, which is numbered from 0. Z is defined as that shown in the foregoing formula (3).

"The sum of the operation result and the concurrent TTI partition index is used to indicate a default common E-DCH resource corresponding to the random access parameter" described in step 403 may specifically include: learning, according to a sequence of the default E-DCH resource index in a resource serial number table and a start serial number (that is, the Concurrent TTI partition index) of the 2 ms common E-DCH resource in the first system information block, a corresponding resource serial number of the default E-DCH resource in the first system information block, that is, the resource serial number corresponding to the resource in the foregoing Table 8.

For details about understanding of "learning a corresponding resource serial number of the default E-DCH resource in the first system information block", reference may be made to the following formula (5):

$$X = X' + \text{concurrent TTI partition index} \quad (5);$$

where X is a corresponding serial number of the default common E-DCH resource in the first system information block, that is, the sum of the result of the modulo operation and the concurrent TTI partition index is used to indicate the default common E-DCH resource corresponding to the random access parameter.

In the foregoing calculation result, an index of the common E-DCH resource in the resource list maintained by the UE is obtained by using the modulo operation, where specific content corresponding to the index in the resource list maintained by the UE is an actual serial number of the common E-DCH resource in the first system information block. A mapping between the index and the actual serial number of the common E-DCH resource in the first system information block may also be obtained by using the foregoing formula (5). As shown in the second list in FIG. 5a, the resource list reflects a mapping between the index and the actual serial number in the first system information block by using formula (5). In addition, in subsequent embodiments, X and X' have the same explanation, which is not repeatedly described in the subsequent embodiments.

Figure 5B:
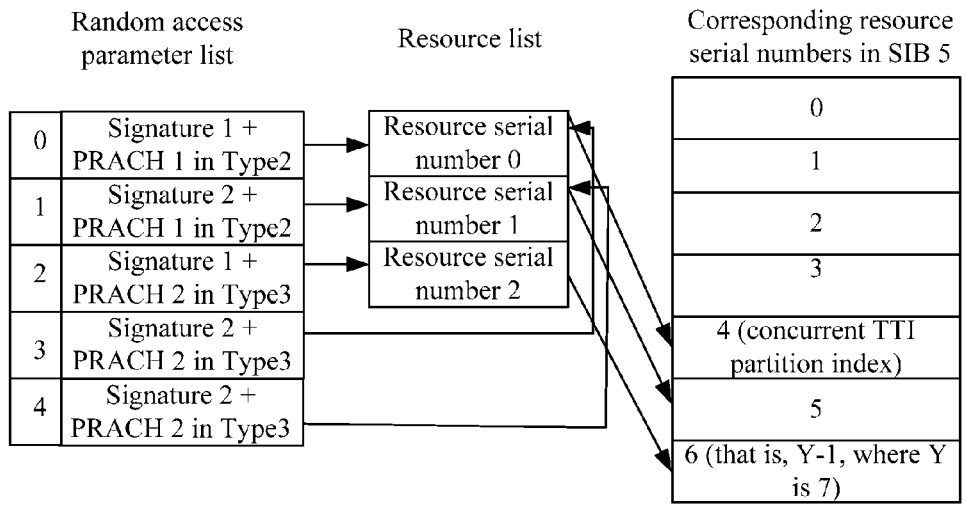
FIG. 5b is a schematic diagram showing a specific numeric example of a mapping between a random access parameter and a default Common E-DCH resource obtained in method Embodiment 3 of the present invention.

With reference to FIG. 5a, after the modulo operation is performed according to formula (4), a sequence X' of the default common E-DCH resource index in the resource list is obtained. Arrows in FIG. 5a represent serial numbers of default Common E-DCH resources corresponding to random access parameters in the resource list, and a resource corresponding to a resource in the SIB5 is used as the default E-DCH resource according to formula (5). An example is used for better ease of understanding of FIG. 5a and the foregoing step 403. As shown in FIG. 5b, for example, if N is 5, Y is 7, and the Concurrent TTI partition index is 4, values of X' include: X'=0 mod 3=0, X'=1 mod 3=1, X'=2 mod 3=2, X'=3 mod 3=0, and X'=4 mod 3=1. When the number of signatures and PRACHs included in the resource list is greater than the number of resources, remaining signatures and PRACHs correspond to the resources starting from the first resource in the Resource serial number table again. If X' is 0, 1, and 2, a corresponding resource serial number in the SIB5 is 4, 5, and 6, respectively; that is, X is 4, 5, and 6. Specific values in FIG. 5b are only explanations for ease of understanding, and do not limit this embodiment of the present invention.

The foregoing describes a method for obtaining a mapping between a random access parameter and a resource provided in Embodiment 3 of the present invention. In this method, a resource list and a serial number of a resource in the list are obtained by obtaining a random access parameter list and a serial number of a parameter in the list; and a modulo operation is performed for a serial number of a random access parameter in the random access parameter list and the number of obtained available 2 ms common E-DCH resources, and the operation result is used as a default E-DCH resource index. This method can implement a solution of defining a corresponding default E-DCH resource after a signature and a PRACH are further divided.

In addition, in this method, a 10 ms TTI resource and a 2 ms TTI resource in a SIB5 can be differentiated, thereby avoiding a case that a random access parameter that can correspond to only the 2 ms TTI resource corresponds to the 10 ms TTI resource incorrectly, and further improving efficiency of a random access process.

Embodiment 4

This embodiment of the present invention provides a method for obtaining a mapping between a random access parameter and a resource. This method is similar to the method provided in the foregoing Embodiment 3, and configurations obtained by a UE from a network side device are also configurations of type 2 (Type2) and type 3 (Type3) in a SIB22; or it may also be understood that only configurations of type 2 and type 3 in a SIB22 are read on the UE side. A difference lies in that in step 403, the operation "performing a modulo operation for the serial number of the parameter in the random access parameter list and the number of obtained available 2 ms common E-DCH resources, where the sum of the operation result and the concurrent TTI partition index is used to indicate a default common E-DCH resource corresponding to the random access parameter" is implemented according to formula (4), while in this embodiment, this operation is specifically implemented by using the following formula (6), that is:

$$X' = (Z-1) - (\text{SigInd} \bmod Z) \quad (6)$$

Explanations corresponding to all parameters are the same as those in the foregoing Embodiment 3.

Figure 6A:
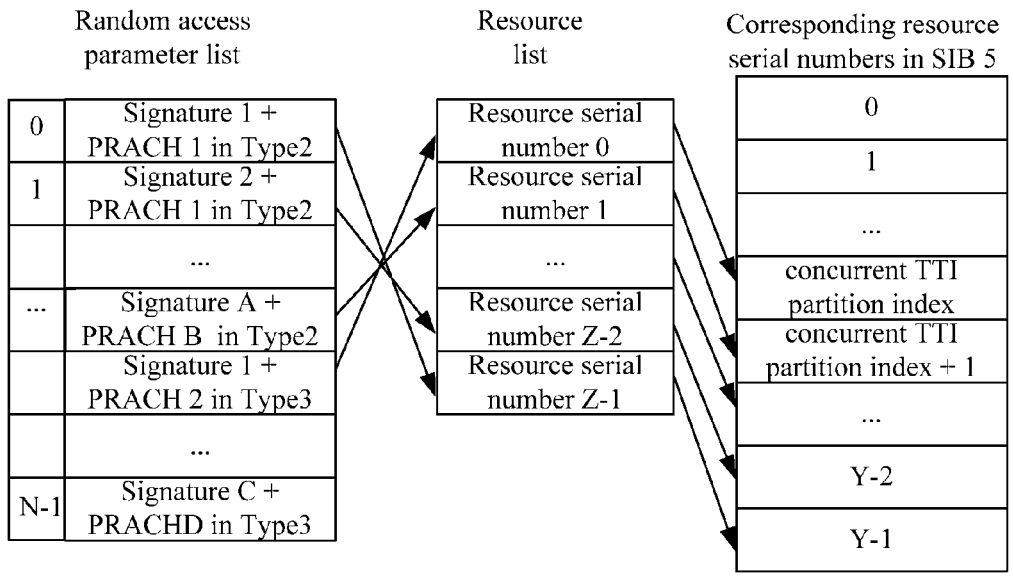
FIG. 6a is a schematic diagram of a mapping between a random access parameter and a default Common E-DCH resource obtained in method Embodiment 4 of the present invention.
Figure 6B:
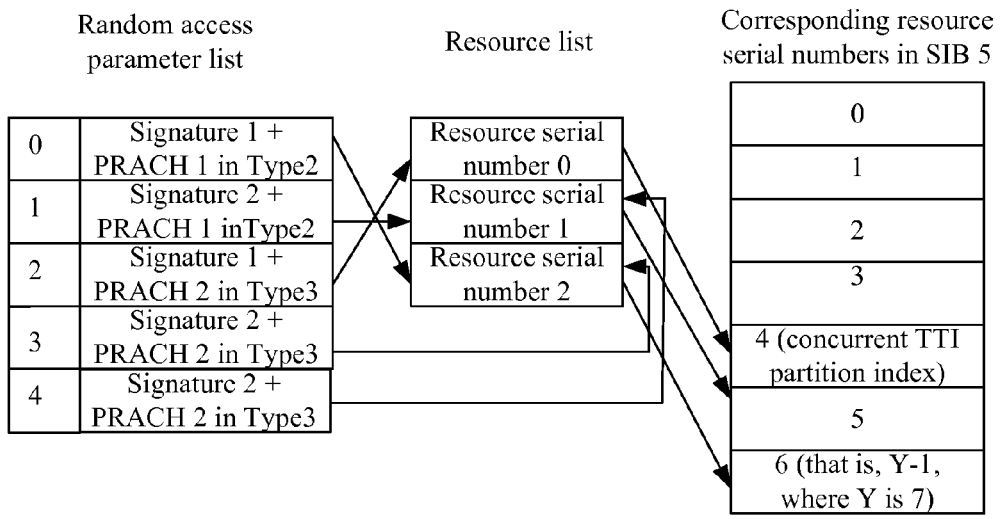
FIG. 6b is a schematic diagram showing a specific numeric example of a mapping between a random access parameter and a default Common E-DCH resource obtained in method Embodiment 4 of the present invention.

With reference to FIG. 6a, after the modulo operation is performed according to formula (6), a default common E-DCH resource index is obtained. Arrows in FIG. 6a represent serial numbers of default Common E-DCH resources corresponding to random access parameters in the resource list, and a resource corresponding to a resource in a SIB5 is used as the default E-DCH resource according to formula (5). An example is used for better ease of understanding of FIG. 6a and the foregoing step 403. As shown in FIG. 6b, for example, if N is 5, Y is 7, and the Concurrent TTI partition index is 4, values of X' include: X'=(3−1)−(0 mod 3)=2, X'=(3−1)−(1 mod 3)=1, X'=(3−1)−(2 mod 3)=0, X'=(3−1)−(3 mod 3)=2, and X'=(3−1)−(4 mod 3)=1. When the number of signatures and PRACHs included in the resource list is greater than the number of resources, remaining signatures and PRACHs correspond to the resources according to formula (6). If the default common E-DCH resource index X' is 2, 1, and 0, corresponding resource serial number X in the SIB5 is 6, 5, and 4, respectively.

It can be easily seen with reference to FIG. 6a and FIG. 6b that a serial number of resources that correspond to the random access parameters that are arranged serially start from the last serial number, that is, the resource serial number starts from Z−1, and resources corresponding to subsequent random access parameters are numbered backwards starting from Z−1. A part of resources may support both a 10 ms TTI and a 2 ms TTI, and resources supporting 2 ms TTI are resources numbered after the concurrent TTI partition index, and this type of resources may also support a 10 ms TTI. Therefore, in other words, a resource with a serial number arranged in front is more likely to be competed for by a UE supporting the 10 ms TTI, while a resource with a serial number arranged at the back may be less likely to be competed in comparison with the resources with the serial number arranged in front. Therefore, when a default E-DCH resource index is obtained by using formula (6), an occurrence probability of a case that when the UE selects a 10 ms TTI type or the UE selects a 2 ms TTI type, default common E-DCH resources corresponding to a selected signature and PRACH are the same can be greatly reduced, thereby improving random access efficiency.

Embodiment 5

Figure 7A:
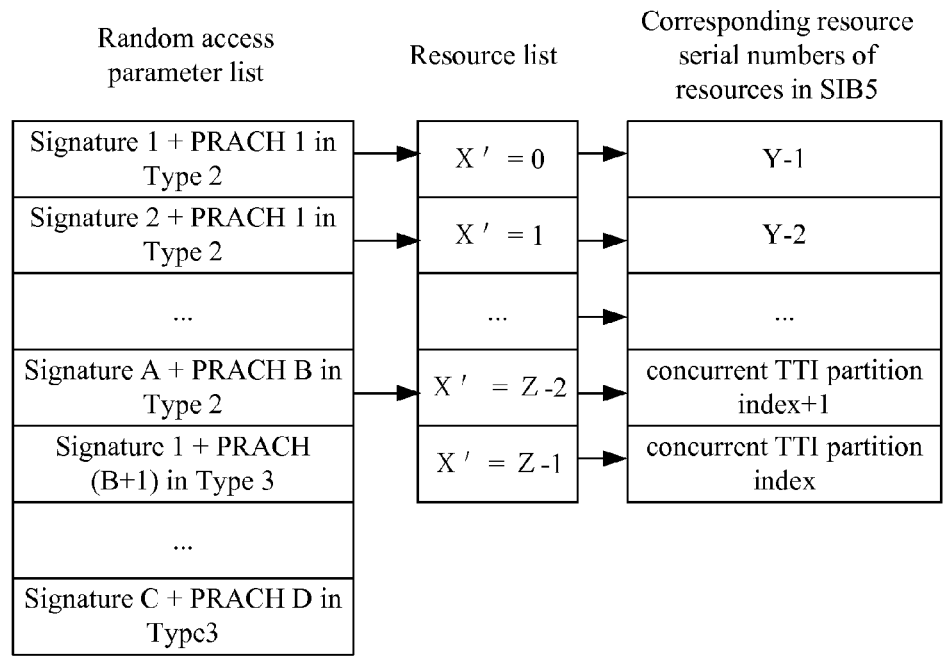
FIG. 7a is a schematic diagram of a mapping between a random access parameter and a default Common E-DCH resource obtained in method Embodiment 5 of the present invention.

This embodiment of the present invention provides a method for obtaining a mapping between a random access parameter and a resource. This method is similar to the method provided in the foregoing Embodiment 3, and configurations obtained by a UE from a network side device are also configurations of type 2 (Type2) and type 3 (Type3) in a SIB22; or it may also be understood that only configurations of type 2 and type 3 in a SIB22 are read on the UE side. A difference lies in that in Embodiment 3 and Embodiment 4, resources in a SIB5 obtained by the UE are arranged serially, while resources in a SIB5 obtained in this embodiment are arranged in descending order. In other words, a serial number in a resource list in this embodiment corresponds to a resource serial number in the SIB5 according to the following formula (7). A corresponding resource serial number in the SIB 5 is shown in FIG. 7a.

Implementation of the technical solution provided in this embodiment of the present invention is similar to that in Embodiment 3, that is, the technical solution provided in this embodiment also includes step 401, step 402, and step 403 in Embodiment 3. For details, reference may be made to the specific descriptions in Embodiment 3. Only a difference that is described here between Embodiment 5 and Embodiment 3 lies in that the operation of step 403 in Embodiment 5 is also implemented based on formula (4), that is, $$X'=\text{SigInd} \bmod Z \qquad (4);$$

where each parameter in formula (4) is defined as aforementioned, X' is a sequence of each resource that appears in a corresponding 2 ms table, that is, a resource index in a resource list maintained by the UE, and the resource list includes only a 2 ms Common E-DCH resource after the concurrent TTI partition index and starts from 0;

however, because the resources in the SIB5 are arranged in descending order, X is obtained according to formula (7):

$$X=Y-1-X' \qquad (7)$$

where X is a corresponding serial number of a default common E-DCH resource in the SIB5, and Y is the number of resources in the SIB5, that is, a difference between the largest resource serial number in the SIB5 and a result of the modulo operation is used to indicate a default common E-DCH resource corresponding to the random access parameter.

Figure 7B:
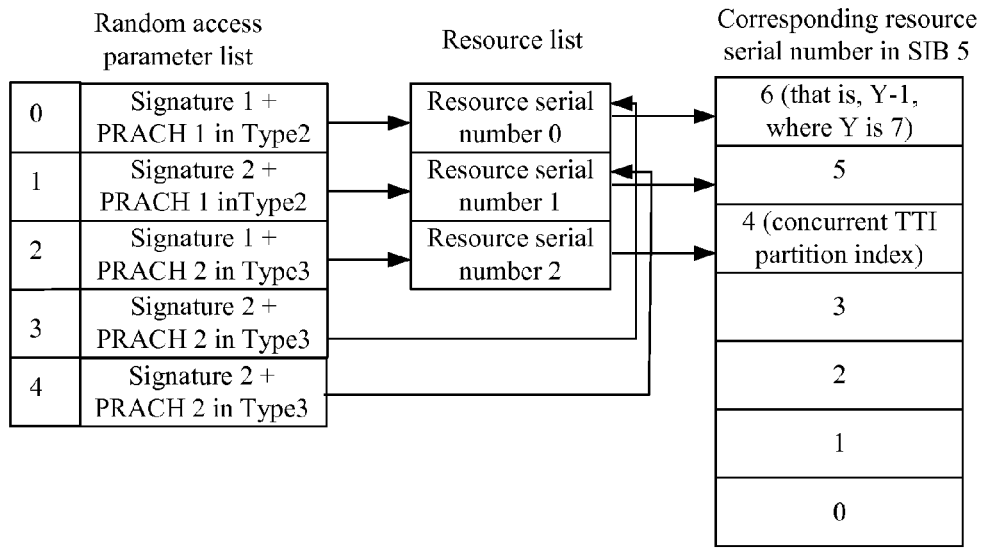
FIG. 7b is a schematic diagram showing a specific numeric example of a mapping between a random access parameter and a default Common E-DCH resource obtained in method Embodiment 5 of the present invention.

With reference to FIG. 7a, after the modulo operation is performed according to formula (4), a sequence X' of the default common E-DCH resource index in the resource list is obtained, and a resource corresponding to a resource in the SIB5 is used as the default E-DCH resource according to formula 7. An example is used for better ease of understanding of FIG. 7a. As shown in FIG. 7b, for example, if N is 5, Y is 7, and the Concurrent TTI partition index is 4, values of X' include: X'=0 mod 3=0, X'=1 mod 3=1, X'=2 mod 3=2, X'=3 mod 3=0, and X'=4 mod 3=1. When the number of signatures and PRACHs included in the resource list is greater than the number of resources, remaining signatures and PRACHs correspond to the resources starting from the first resource in a Resource serial number table again. If X' is 0, 1, and 2, a corresponding resource serial number in the SIB5 is 6, 5, and 4, respectively; that is, X is 6, 5, and 4. Specific values in FIG. 7b are only explanations for ease of understanding, and do not limit this embodiment of the present invention.

The foregoing describes a method for mapping a random access parameter to a resource provided in Embodiment 5 of the present invention. In this method, a resource list and a serial number of a resource in the list are obtained by obtaining a random access parameter list and a serial number of a parameter in the list; and a modulo operation is performed for a serial number of a random access parameter in the random access parameter list and the number of obtained available 2 ms common E-DCH resources, and the operation result is used as a default E-DCH resource index. This method can implement a solution of defining a corresponding default E-DCH resource after a signature and a PRACH are further divided.

In addition, in this method, a device can differentiate a 10 ms TTI resource from a 2 ms TTI resource in a SIB5, thereby avoiding a case that a random access parameter that can correspond to only the 2 ms TTI resource corresponds to the 10 ms TTI resource incorrectly, and further providing efficiency of a random access process.

Embodiment 6

In this embodiment, a random access parameter list (that is, a list including a signature and a PRACH) maintained by a UE is the same as a table in which the UE selects a random access parameter. Compared with Embodiment 2, if a UE that supports only a common E-DCH feature and a UE that supports some FE-FACH features compete for a 10 ms common E-DH resource, manners of maintaining the table and calculating a default resource are the same as that in Embodiment 2. A difference lies in a method for calculating a mapping between a 2 ms resource and a common E-DCH resource.

Figure 8:
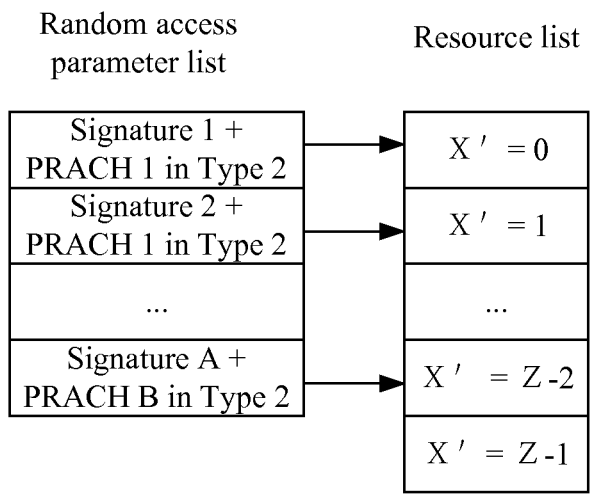
FIG. 8 is a schematic diagram of a mapping between a random access parameter in Type2 and a default Common E-DCH resource obtained in method Embodiment 6 of the present invention.

When a TTI selection result is 2 ms and the UE does not support a per hybrid automatic repeat request (non per HARQ, Hybrid Automatic Repeat Request) scheduling feature and a TTI alignment (alignment) (it may be understood that the UE does not support a TDM); or when the UE supports the per HARQ and the TTI alignment, but a network side device is not configured with and does not enable this feature (or a network side device does not support this feature), the random access parameter list obtained by the UE includes only a parameter in Type2. As shown in FIG. 8, in this case, the UE obtains a configuration of Type 2 on the network side device, and parameters (a signature and a PRACH) in the random access parameter list obtained (or maintained) by the UE are all from Type 2. For details of obtaining a mapping between a random access parameter and a default enhanced dedicated channel resource, reference may be made to formula (4) and formula (5) that have already been described in the foregoing Embodiment 3, that is:

$$X'=\text{SigInd mod } Z \qquad (4);$$

$$X=X'+\text{concurrent TTI partition index} \qquad (5);$$

For specific understanding of the foregoing formula (4) and formula (5), reference may be made to the descriptions in Embodiment 3, which are not repeatedly described herein.

Or, for details of obtaining, by the UE, a mapping between a random access parameter and a default enhanced dedicated channel resource, reference may be made to formula (5) that has already been described in the foregoing Embodiment 3 and formula (6) that has already been described in Embodiment 4, that is:

$$X'=(Z-1)-(\text{SigInd mod } Z) \qquad (6)$$

$$X=X'+\text{concurrent TTI partition index} \qquad (5);$$

The following formula (6a) can be obtained according to the foregoing formula (6) and formula (5):

$$X=(Y-1)-(\text{SigInd mod } Z) \qquad (6a)$$

Figure 9:
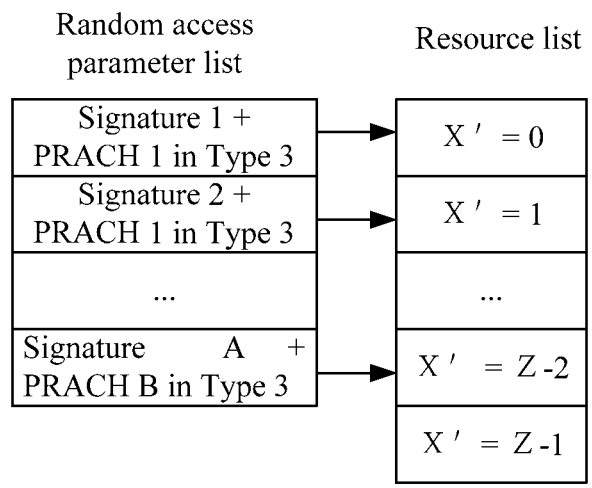
FIG. 9 is a schematic diagram showing a specific numeric example of a mapping between a random access parameter in Type3 and a default Common E-DCH resource obtained in method Embodiment 6 of the present invention.

Similarly, when a TTI selection result is 2 ms, the UE supports the per and the TTI alignment (it may be understood that the UE supports the TDM), and the network side device is configured with and enables this feature, if Type 3 has already been configured, both a signature and a PRACH maintained by the UE are from Type 3. In this case, the random access parameter list obtained by the UE includes only a parameter in Type3. As shown in FIG. 9, the UE obtains a configuration of Type 3 on the network side device, and parameters (a signature and a PRACH) in the random access parameter list obtained (or maintained) by the UE are all from Type 3. For details of obtaining, by the UE, a mapping between a random access parameter and a default enhanced dedicated channel resource, reference may be made to formula (4) and formula (5) that have already been described in the foregoing Embodiment 3, that is:

$$X'=\text{SigInd mod } Z \qquad (4);$$

$$X=X'+\text{concurrent TTI partition index} \qquad (5);$$

Or, a mapping between a random access parameter and a default enhanced dedicated channel resource is obtained with reference to a formula $X'=(\text{SigInd}+H) \text{ mod } Z$, where H is the number of random access parameters configured in Type2, and descriptions of X', SigInd, and Z are the same as those described above.

Or, for details of obtaining, by the UE, a mapping between a random access parameter and a default enhanced dedicated channel resource, reference may be made to formula (5) that has already been described in the foregoing Embodiment 3 and formula (6) that has already been described in Embodiment 4, that is:

$$X'=(Z-1)-(\text{SigInd mod } Z) \qquad (6)$$

$$X=X'+\text{concurrent TTI partition index} \qquad (5);$$

The following formula (6a) can be obtained according to the foregoing formula (6) and formula (5):

$$X=(Y-1)-(\text{SigInd mod } Z) \qquad (6a)$$

If a resource table maintained by the UE is a table including all configuration resources, the UE obtains, through calculation, X in the foregoing manner, that is, it obtains default common E-DCH resources corresponding to a selected signature and PRACH in the whole list.

When parameters (a signature and a PRACH) in the random access parameter list obtained (or maintained) by the UE are all from Type 2; or parameters (a signature and a PRACH) in the random access parameter list obtained (or maintained) by the UE are all from Type 3, a probability that different UEs compete for a same resource increases. Therefore, compared with the foregoing Embodiment 3, Embodiment 4, and Embodiment 5, a probability of successfully obtaining, through competition, a resource in this embodiment is higher than that in Embodiment 3, Embodiment 4, and Embodiment 5. To reduce a conflict probability, when the following two types of UEs simultaneously exist in a corresponding cell:

first type: A UE whose random access parameter list includes only a parameter in Type2; and second type: A UE whose random access parameter list includes only a parameter in Type3, for the first type of UE, the foregoing formula (4) and formula (5) are used to calculate a default common E-DCH resource; for the second type of UE, formula (6) or formula (6a) is used to calculate a default common E-DCH resource; or for the first type of UE, the foregoing formula (6) or formula (6a) is used to calculate a default common E-DCH resource; for the second type of UE, formula (4) and formula (5) are used to calculate a default common E-DCH resource.

This embodiment of the present invention provides a method for obtaining a mapping between a random access parameter and a resource, in this technical solution, a random access parameter list is obtained, and a serial number of a random access parameter is obtained; a UE obtains a resource list and can obtain a mapping between the random access parameter and a default enhanced dedicated channel resource according to the serial number of the random access parameter and the number of resources in the obtained resource list; and in a case that there is more than one PRACH, a solution of obtaining a mapping between random access parameter and the default enhanced dedicated channel resource is provided, thereby improving random access efficiency. After a network side device determines a mapping manner between the random access parameter (that is, a signature and a PRACH) and a default common E-DCH resource according to this solution, the UE initiates a random access process after selecting a random access parameter; a NodeB can determine, according to a detected signature and PRACH, a resource that the UE wants to obtain, and grants the resource by using an AI; and if the resource has already been occupied, the NodeB can indicate another unoccupied resource by using an EAI.

Embodiment 7

This embodiment provides a method for obtaining a mapping between a random access parameter and a resource. In this method, it is considered that all resources support a 10 ms TTI and a 2 ms TTI, and a UE can maintain a list. According to a capability of the UE, the list includes all random access parameters (that is, a signature and a PRACH) that can be read by the UE, the random access parameters are arranged according to a sequence of the random access parameters that appear in a SIB, and resources are arranged according to a sequence in the SIB.

The method includes:

Step 701: Obtain a random access parameter list, and obtain a serial number of a parameter in the random access parameter list, where the random access parameter list includes a random access parameter in a first system information block (a SIB5) and random access parameters in Type1, Type2, and Type3 in a SIB22; or, the random access list obtained by the UE includes only a random access parameter in Type1 in a SIB22; or, the random access list obtained by the UE includes: a random access parameter in a first system information block (a SIB5) and random access parameters in Type2 and Type3 in a SIB22; or, the random access parameter list includes a random access parameter in a first system information block and a random access parameter in type 2 in a second system information block; or, the random access parameter list includes a random access parameter in a first system information block and a random access parameter in type 3 in a second system information block. The UE may obtain the foregoing corresponding random access parameter list according to a capability of the UE, that is, the UE may arrange the obtained parameters in ascending order according to the capability of the UE.

Step 702: Obtain a resource list, where the resource list may be a list formed of all resources in the SIB5.

Step 703: Obtain a mapping between the random access parameter and a default enhanced dedicated channel resource according to the serial number in the obtained random access parameter list and the number of resources in the resource list, which may specifically include: performing a modulo operation for a serial number of a random access parameter in the random access parameter list and the total number of resources in the obtained resource list, where the operation result is used as a default E-DCH resource index, the default E-DCH resource index is used to indicate a default E-DCH resource, and the default E-DCH resource is a common E-DCH resource corresponding to an index in the resource list.

For details about understanding of the foregoing step 703, reference may be made to the following formula (2) described in Embodiment 2, that is:

$$X = \text{SigInd} \bmod Y \quad (2)$$

where a definition of each parameter in formula (2) is the same as that in Embodiment 2.

Figure 10:
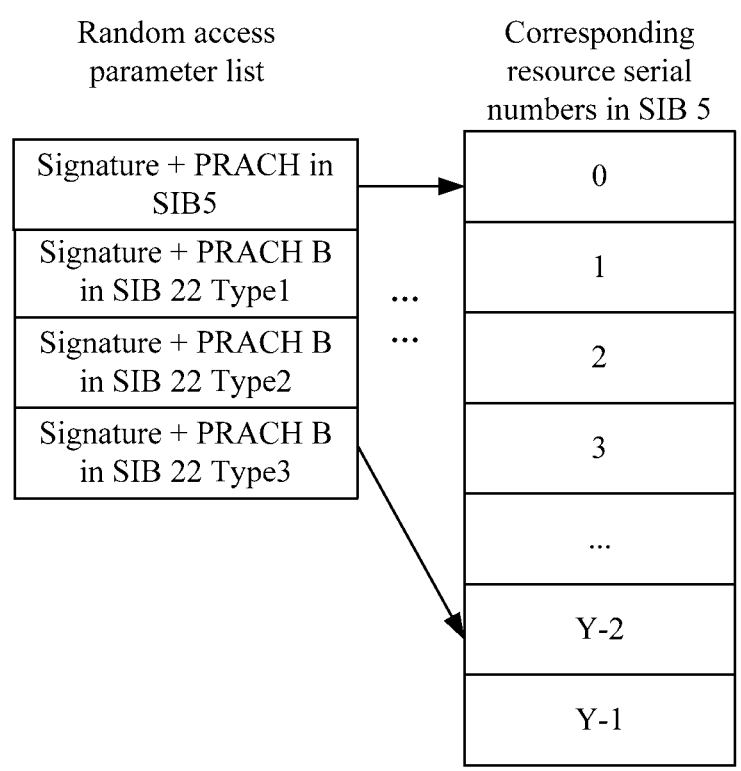
FIG. 10 is a schematic diagram showing a specific numeric example of a mapping between a random access parameter and a default Common E-DCH resource obtained in method Embodiment 7 of the present invention.

Embodiment 8 has the same understanding as Embodiment 2, with a difference in that in this embodiment, all resources support a 10 ms TTI and a 2 ms TTI. Preferably, a UE supporting a FE-FACH sub-feature maintain a table, where the table includes all random access parameters (that is, a signature and a PRACH) that can be read by the UE according to the capability of the UE, and the random access parameters are arranged according to a sequence of the random access parameters that appear in the SIB, where the sequence is configured by the network side device. In addition, resources in the resource list are arranged according to a sequence in the SIB. As shown in FIG. 10, according to the foregoing formula (2), the mapping between the random access parameter and the default enhanced dedicated channel resource is obtained. Arrows in FIG. 10 are used only for ease of understanding of the mapping. A specific mapping depends on a specific random access list and a resource, which is not embodied in FIG. 10, and FIG. 10 is used only for ease of understanding that a mapping exists between the two lists. One list in FIG. 10 shows all random access parameters that can be read by the UE, and serial numbers in the list are arranged according to a sequence of all random access parameters that appear in the SIB, where the sequence is configured by the network side device, and a second list shows that resources are arranged according to a sequence in the SIB.

This embodiment of the present invention provides a method for obtaining a mapping between a random access parameter and a resource, in this technical solution, a random access parameter list is obtained, and a serial number of a random access parameter is obtained; a UE obtains a resource list and can obtain a mapping between the random access parameter and a default enhanced dedicated channel resources according to the serial number of the random access parameter and the number of resources in the obtained resource list; and in a case that there is more than one PRACH, a solution of obtaining a mapping between the random access parameter and the default enhanced dedicated channel resource is provided, thereby improving random access efficiency. After a network side device determines a mapping manner between the random access parameter (that is, a signature and a PRACH) and a default common E-DCH resource according to this solution, the UE initiates a random access process after selecting a random access parameter; a NodeB can determine, according to a detected signature and PRACH, a resource that the UE wants to obtain, and grants the resource by using an AI; and if the resource has already been occupied, the NodeB can indicate another unoccupied resource by using an EAI.

Embodiment 8

This embodiment of the present invention further provides a method for obtaining a mapping between a random access parameter and a resource. When a UE that supports TTI type selection selects a 10 ms TTI or a UE that does not support TTI type selection supports a part of FE-FACH sub-features and Type1 occurs, a random access parameter in a SIB22 (Type 1) may first be recorded in a parameter table that is maintained by the UE, and then a random access parameter in a SIB5 is recorded, that is, a serial number of a random access parameter in the SIB22 (Type 1) is smaller than a serial number of a random access parameter in the SIB5.

The method includes:

Step 801: Obtain a random access parameter list, and obtain a serial number of a parameter in the random access parameter list, where the random access parameter list includes a random access parameter in Type1 in a SIB22 and a random access parameter in a first system information block (SIB5); and a serial number of the random access parameter in the SIB22 (Type 1) is smaller than a serial number of the random access parameter in the SIB5.

Step 802: Obtain a resource list, where the resource list may be a list including a resource in the SIB5.

Step 803: Obtain a mapping between the random access parameter and a default enhanced dedicated channel resource according to the serial number in the obtained random access parameter list and the number of resources in the resource list.

Figure 11:
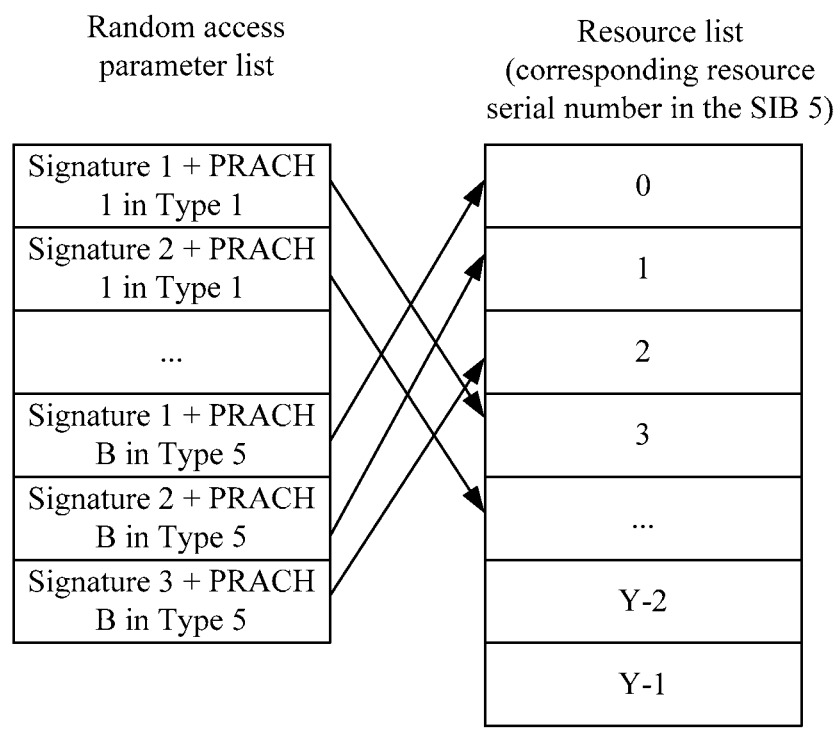
FIG. 11 is a schematic diagram showing a specific numeric example of a mapping between a random access parameter and a default Common E-DCH resource obtained in method Embodiment 8 of the present invention.

A specific operation in step 803 may include what is shown in the left list in FIG. 11.

In this case, in order to maintain consistence with an original mapping between a signature and a common E-DCH in the SIB5, for a mapping manner between the random access parameter in the SIB5 and a default common E-DCH resource, reference may still be made to the following formula (2) described in Embodiment 2:

$$X = \text{SigInd} \bmod Y \quad (2)$$

For a formula for calculating the random access parameter (a signature and a PRACH) in Type1 in the random access parameter list and the default common E-DCH resource, reference may be made to the following formula (8):

$$X = (\text{SigInd} + W) \bmod Y \quad (8)$$

where W is the number of random access parameters (that is, a signature and a PRACH) in the SIB5 that are used for common E-DCH access, and definitions of other parameters in formula (8) are the same as the definitions of the parameters described in Embodiment 2 and Embodiment 3, which are not repeatedly described herein.

According to the foregoing formula (2) and formula (8), the UE may obtain the default common E-DCH resource corresponding to the random access parameter.

This embodiment of the present invention provides a method for obtaining a mapping between a random access parameter and a resource, in this technical solution, a random access parameter list is obtained, and a serial number of a random access parameter is obtained; a UE obtains a resource list and can obtain a mapping between the random access parameter and a default enhanced dedicated channel resource according to the serial number of the random access parameter and the number of resources in the obtained resource list; and in a case that there is more than one PRACH, a solution of obtaining a mapping between the random access parameter and the default enhanced dedicated channel resources is provided, thereby improving random access efficiency. After a network side device determines a mapping manner between the random access parameter (that is, a signature and a PRACH) and a default common E-DCH resource according to this solution, the UE initiates a random access process after selecting a random access parameter; a NodeB can determine, according to a detected signature and PRACH, a resource that the UE wants to obtain, and grants the resource by using an AI; and if the resource has already been occupied, the NodeB can indicate another unoccupied resource by using an EAI.

Embodiment 9

This embodiment of the present invention further provides a method for obtaining a mapping between a random access parameter and a resource. A difference between this embodiment and the foregoing Embodiment 1 to Embodiment 8 lies in that in the foregoing embodiments, a serial number of a random access parameter in a random access parameter list obtained by a UE is numbered according to an obtaining sequence of the UE, starting from 0 in ascending order, where the sum of the largest serial number in the list plus 1 may represent the total number of random access parameters, that is, the total number of all random access parameters in different PRACHs may be learned according to the serial number.

Figure 12A:
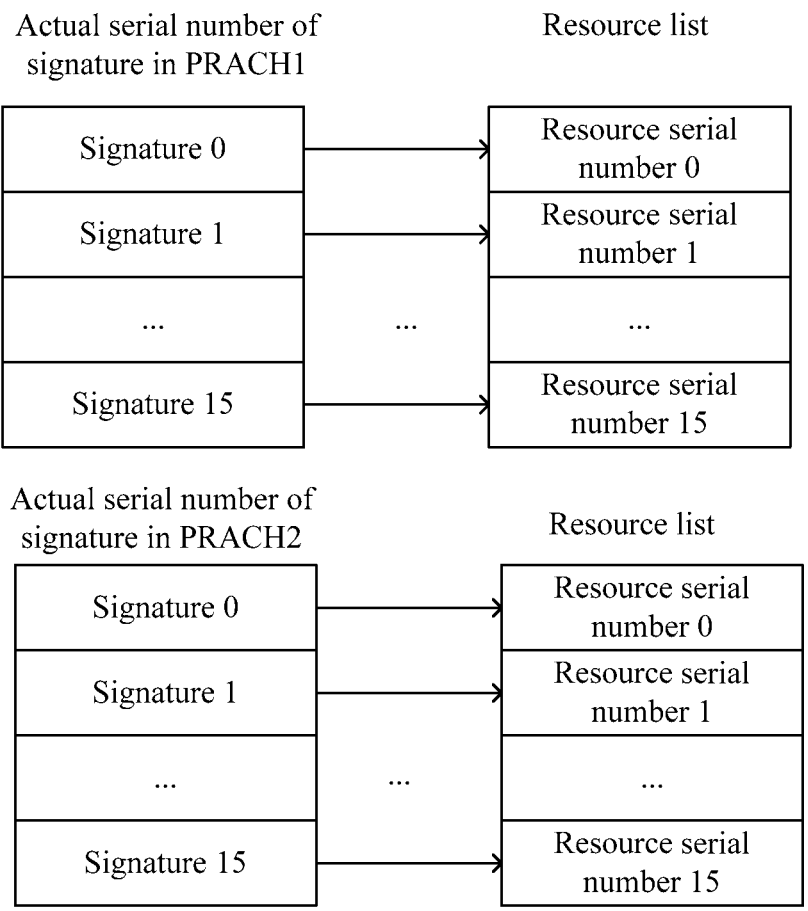
FIG. 12a is a schematic diagram showing an example of a mapping between a signature on each PRACH and a default Common E-DCH resource in method Embodiment 9 of the present invention.
Figure 12B:
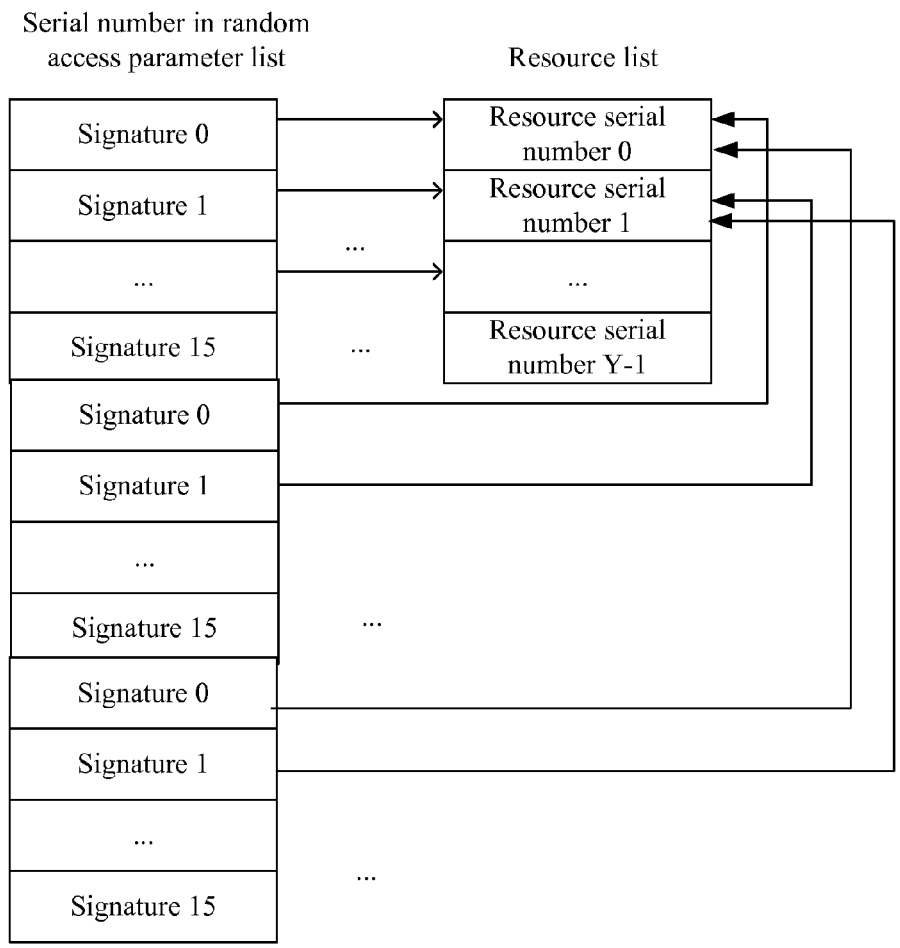
FIG. 12b is a schematic diagram showing an example of a mapping between an actual serial number of a signature and a default Common E-DCH resource in method Embodiment 9 of the present invention.

However, in a random access parameter list obtained by the UE in Embodiment 9, a serial number of each random access parameter (specifically a signature) is an actual serial number of each random access parameter on a corresponding PRACH. The serial number is a numerical value between 0 and 15, and serial numbers of signatures corresponding to different PRACH channels in the list may be the same. The foregoing random access parameter list obtained by the UE may also not exist, and the UE may only need to obtain a serial number of a random access parameter, that is, after the UE only needs to know a serial number of a signature after obtaining the signature, and random access parameter lists shown in FIG. 12a and FIG. 12b are not required. That is, in this embodiment, the UE only needs to obtain the serial number of the random access parameter.

It should be understood that currently, each PRACH channel has a maximum of 16 available signatures that are configured in a bit string (bitstring) manner, as shown in the following Table 9:

TABLE 9

| Available signature | MD | Bit string(16) | The default value is the inverse of the bitstring indicated in the IE "Available Signature" in the IE "PRACH Info (for RACH)". Each bit indicates availability for a signature. Each bit indicates availability for a signature. Each available signature on the AICH is associated with one Common E-DCH Resource Configuration in the "Common E-DCH resource configuration information list". | Available signature |
|---|---|---|---|---|

When the bit string is 1, it represents that the signature is available; and when the bit string is 0, it represents that the signature is unavailable. For example, 1101 0011 1011 0111 represents that signatures with actual serial numbers of 0, 1, 3, 6, 7, 8, 10, 11, 13, 14, and 15 are available. The serial numbers of the available signatures refer to positions of appearance in the bitstring.

The foregoing explanation is applicable to each PRACH channel. In this embodiment, the UE obtains a random access parameter list according to obtained serial numbers of signatures on all PRACH channels. By using the following formula:

$$X = \text{SigInd} \bmod Y \quad (9)$$

default common E-DCH resources corresponding to the signatures are obtained. Explanations of Y and X are the same as those in the foregoing embodiments, and SigInd is an actual serial number of a random access parameter (that is, a signature) on a corresponding PRACH, that is, a position of appearance in the bitstring. For example, if the bitstring is 1101 0011 1011 0111, it represents that the actual serial numbers of the signatures are 0, 1, 3, 6, 7, 8, 10, 11, 13, 14, and 15, and the values of SigInd are 0, 1, 3, 6, 7, 8, 10, 11, 13, 14, and 15.

When multiple PRACH channels are configured on a network side, a signature in each PRACH channel is numbered according to a configuration of the bitstring. As shown in FIG. 12a, assuming that the UE obtains signatures on two PRACH channels, namely, PRACH1 and PRACH2, where actual serial numbers of signatures in each PRACH are numbered from 0 to 15, resources on each PRACH correspond to the same resources according to X=SigInd mod Y, that is, resources numbered from 0 to 15 in the resource list. FIG. 12a is only an example for ease of understanding. The number of PRACHs may also be another value, and each PRACH includes 16 signatures.

As shown in FIG. 12b, it shows a random access parameter list actually obtained by the UE, where the list includes signatures on multiple PRACHs. A serial number of a signature in the list still uses an actual serial number of each signature on a corresponding PRACH. Therefore, the serial number in the list can appear repeatedly, that is, all serial numbers are digits from 0 to 15. The UE determines a mapping between a signature and a default common E-DCH resource according to formula (9).

In this embodiment, the resource list maintained by the UE is a resource list configured in the current SIB5. Specifically, there are two manners for maintaining the resource list:

Manner 1: The resource list maintained by the UE is a resource configured in the SIB5. In a SIB5 configuration, a resource before a Concurrent TTI partition index represents a resource that supports both a 2 ms TTI and a 10 ms TTI, and a resource after the Concurrent TTI partition index represents a resource that supports 10 ms only.

X that is obtained through calculation by using X=signd mode Y is a serial number of the resource in the SIB5. When the UE selects a 2 ms resource and the network side changes the type of the resource, the network side needs to indicate changing of a resource type of the resource with the serial number after the Concurrent TTI partition index, that is, changing from 2 ms to 10 ms.

Manner 2: The resource list maintained by the UE is all resources configured in the SIB5. The UE considers that all resources in the SIB5 support 10 ms and 2 ms.

X that is obtained through calculation by using X=signd mode Y is a serial number of the common E-DCH resource in the SIB5. After selecting a signature, the UE obtains, through calculation, a default resource by using the foregoing formula, and the network side determines, by using the signature, a resource type of a resource that the UE competes for. When the network side changes the resource type, the network side may perform indication by indicating the UE to use a resource numbered after the Concurrent TTI partition index. For example, Y=10, and Concurrent TTI partition index=5.

If the UE selects signature=3 to compete for a 2 ms resource and is allowed by the network side, the network side returns AI=ACK, representing that the UE can use a resource that is numbered 3 and uses a TTI type of 2.

If the network side requires the UE to use a 10 ms TTI, the network side returns AI=NACK and indicates, by using an EAI, any one of resources 0, 1, 2, and 4 to be used by the UE, representing that the TTI type used by the UE is 10.

If the network side requires the UE to use a 2 ms TTI, but resource 3 is unavailable, the network side returns AI=NACK and indicates, by using an EAI, any one set of resources after resource 5 to be used by the UE.

The foregoing examples are only exemplary, and the network side may also represent a change of the TTI type by indicating a resource after the Concurrent TTI partition index, which is not limited herein.

Embodiment 10

Figure 13:
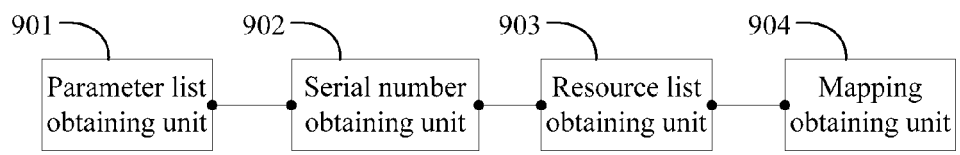
FIG. 13 is a schematic diagram of an apparatus for obtaining a mapping between a random access parameter and a resource according to method Embodiment 9 of the present invention.

This embodiment of the present invention provides an apparatus for obtaining a mapping between a random access parameter and a resource. The apparatus may be a UE, or may also be a network side server or be another device. As shown in FIG. 13, the apparatus includes:

a parameter list obtaining unit 901, a serial number obtaining unit 902, a resource list obtaining unit 903, and a mapping obtaining unit 904.

The parameter list obtaining unit 901 is configured to obtain a random access parameter list.

The serial number obtaining unit 902 is configured to obtain a serial number of a parameter in the random access parameter list.

The resource list obtaining unit 903 is configured to obtain a resource list.

The mapping obtaining unit 904 is configured to obtain a mapping between the random access parameter and a common enhanced dedicated channel resource in the resource list according to the obtained serial number of the random access parameter and the total number of resources in the obtained resource list, so that a network side determines, according to the random access parameter sent by a UE, whether a corresponding common enhanced dedicated channel resource is available.

For a description of the foregoing apparatus, reference may be made to the descriptions in the foregoing method Embodiment 1, which are not repeatedly described herein.

Optionally, when the random access parameter list includes a random access parameter in a first system information block and a random access parameter in type 1 in a second system information block, and a serial number of the random access parameter in the first system information block is smaller than a serial number of the random access parameter in type 1, the resource list obtaining unit 903 is specifically configured to obtain a list of a common enhanced dedicated channel resource corresponding to a cell-level transmission time interval TTI in the first system information block; and the mapping obtaining unit 904 is specifically configured to:

perform a modulo operation for the serial number of the parameter in the random access parameter list and the total number of resources in the resource list, where the operation result indicates a default common E-DCH resource corresponding to the random access parameter and the operation is expressed by using a formula: X=SigInd mod Y, where:

X is a default Common E-DCH resource index, Y is the total number of resources in the resource list, and SigInd is the serial number of the parameter in the random access parameter list.

For more descriptions of the optional apparatus, reference may be made to the descriptions in method Embodiment 2, which are not repeatedly described herein.

Optionally, when the random access parameter list includes a random access parameter in type 2 in a second system information block and a random access parameter in type 3 in the second system information block, the resource list obtaining unit 903 is specifically configured to obtain a list of a 2 ms common E-DCH resource in a first system information block; and the mapping obtaining unit 904 is specifically configured to:

perform a modulo operation for the serial number of the parameter in the random access parameter list and the total number of resources in the obtained list of the 2 ms common E-DCH resource in the first system information block, where the operation result is used to indicate a default common E-DCH resource corresponding to the random access parameter and the operation is expressed by using a formula: X'=SigInd mod Z, where:

X' is a default Common E-DCH resource index and is used to indicate a serial number of a resource in the list of the 2 ms common E-DCH resource, Z is the total number of resources in the list of the 2 ms common E-DCH resource in the first system information block, and SigInd is the serial number of the parameter in the random access parameter list.

For more descriptions of the optional apparatus, reference may be made to the descriptions in method Embodiment 3 and method Embodiment 5, which are not repeatedly described herein.

Optionally, the random access parameter list includes a random access parameter in type 2 in a second system information block and a random access parameter in type 3 in the second system information block;

the resource list obtaining unit 903 is specifically configured to obtain a list that includes only a 2 ms common E-DCH resource in a first system information block; and the mapping obtaining unit 904 is specifically configured to:

perform a modulo operation for the serial number of the parameter in the random access parameter list and the total number of resources in the obtained list of the 2 ms common E-DCH resource in the first system information block, where the operation result is expressed as (SigInd mod Z); and obtain, according to a formula X'=(Z−1)−(SigInd mod Z), a default common E-DCH resource corresponding to the random access parameter, where:

X' is a default Common E-DCH resource index and is used to indicate a serial number of a resource in the list of the 2 ms common E-DCH resource, Z is the total number of resources in the list of the 2 ms common E-DCH resource in the first system information block, and SigInd is the serial number of the parameter in the random access parameter list.

For more descriptions of the optional apparatus, reference may be made to the descriptions in method Embodiment 4, which are not repeatedly described herein.

Optionally, the random access parameter list includes a random access parameter in type 2 in a second system information block;

the resource list obtaining unit 903 is specifically configured to obtain a list of a 2 ms common E-DCH resource in a first system information block; and the mapping obtaining unit 904 is specifically configured to:

perform a modulo operation for the serial number of the parameter in the random access parameter list and the total number of resources in the obtained list of the 2 ms common E-DCH resource in the first system information block, where the operation result is used to indicate a default common E-DCH resource corresponding to the random access parameter and the operation is expressed by using a formula: X'=SigInd mod Z or X'=(Z−1)−(SigInd mod Z), where:

X' is a default Common E-DCH resource index and is used to indicate a serial number of a resource in the list of the 2 ms common E-DCH resource, Z is the total number of resources in the list of the 2 ms common E-DCH resource in the first system information block, and SigInd is the serial number of the parameter in the random access parameter list.

For more descriptions of the optional apparatus, reference may be made to the descriptions in method Embodiment 6, which are not repeatedly described herein.

Optionally, the random access parameter list includes a random access parameter in type 3 in a second system information block;

the resource list obtaining unit 903 is specifically configured to obtain a list of a 2 ms common E-DCH resource in a first system information block; and the mapping obtaining unit 904 is specifically configured to:

perform a modulo operation for the serial number of the parameter in the random access parameter list and the total number of resources in the obtained list of the 2 ms common E-DCH resource in the first system information block, where the operation result is used to indicate a default common E-DCH resource corresponding to the random access parameter and the operation is expressed by using a formula: X'=SigInd mod Z or X'=(Z−1)−(SigInd mod Z), where:

X' is a default Common E-DCH resource index and is used to indicate a serial number of a resource in the list of the 2 ms common E-DCH resource, Z is the total number of resources in the list of the 2 ms common E-DCH resource in the first system information block, and SigInd is the serial number of the parameter in the random access parameter list.

Optionally, the mapping obtaining unit 904 is further configured to obtain a corresponding serial number of the default common enhanced dedicated channel common E-DCH resource in the first system information block by using a formula X=X'+concurrent TTI partition index, where X is the corresponding serial number of the default common E-DCH resource in the first system information block, and the Concurrent TTI partition index is a start serial number of the 2 ms common E-DCH resource in the first system information block.

For more descriptions of the optional apparatus, reference may be made to the descriptions in method Embodiment 6, which are not repeatedly described herein.

Optionally, the random access parameter list includes four parts: a random access parameter in a first system information block, a random access parameter in type 1 in a second system information block, a random access parameter in type 2 in the second system information block, and a random access parameter in type 3 in the second system information block; or, the random access parameter list includes three parts: a random access parameter in a first system information block, a random access parameter in type 2 in a second system information block, and a random access parameter in type 3 in the second system information block; or, the random access parameter list includes only a random access parameter in type 1 in a second system information block; or, the random access parameter list includes a random access parameter in a first system information block and a random access parameter in type 2 in a second system information block; or, the random access parameter list includes a random access parameter in a first system information block and a random access parameter in type 3 in a second system information block; and the mapping obtaining unit 904 is specifically configured to:

perform a modulo operation for the serial number of the parameter in the random access parameter list and the total number of resources in the resource list, where the operation result indicates a default common E-DCH resource corresponding to the random access parameter and the operation is expressed by using a formula: X=SigInd mod Y, where:

X is a default Common E-DCH resource index, Y is the total number of resources in the resource list, and SigInd is the serial number of the parameter in the random access parameter list.

For more descriptions of the optional apparatus, reference may be made to the descriptions in method Embodiment 7, which are not repeatedly described herein.

Optionally, the random access parameter list includes a random access parameter in type 1 in a second system information block and a random access parameter in a first system information block; and a serial number of the random access parameter in the first system information block is larger than a serial number of the random access parameter in type 1; and the mapping obtaining unit 904 is specifically configured to:

perform a modulo operation for the serial number of the random access parameter in the first system information block in the random access parameter list and the total number of resources in the resource list, where the operation result indicates a default common E-DCH resource corresponding to the random access parameter in the first system information block and the operation is expressed by using a formula X=SigInd mod Y, where X is a default Common E-DCH resource index, Y is the total number of resources in the resource list, and SigInd is the serial number of the random access parameter in the first system information block in the random access parameter list; or obtain, according to a formula X=(SigInd+W) mod Y, a default common E-DCH resource corresponding to the random access parameter in type 1, where:

SigInd is the serial number of the random access parameter in type 1 in the random access parameter list, W is the total number of random access parameters in the first system information block in the list, Y is the total number of resources in the resource list, and X is a default common enhanced dedicated channel resource index.

For more descriptions of the optional apparatus, reference may be made to the descriptions in method Embodiment 8, which are not repeatedly described herein.

Optionally, the parameter list obtaining unit 901 includes a receiving unit and a numbering unit, where:

the receiving unit is configured to receive a system broadcast message sent by a network side device, where the system broadcast message includes a random access parameter; and the numbering unit is configured to number, according to a sequence configured in the system broadcast message, the random access parameter serially, so as to obtain the random access parameter list.

Optionally, the resource list obtaining unit 903 is specifically configured to obtain a list of all resources in the first system information block, and obtain the list of the 2 ms common enhanced dedicated channel resource according to a start serial number of a 2 ms resource configured on the network side device.

This embodiment of the present invention further provides an apparatus for obtaining a mapping between a random access parameter and a resource, where the apparatus includes:

a first obtaining unit, a second obtaining unit, and a third obtaining unit.

The first obtaining unit is configured to obtain a serial number of a random access parameter, where the serial number of the random access parameter is an actual serial number of each parameter on a corresponding physical random access channel (PRACH).

The second obtaining unit is configured to obtain a resource list.

The third obtaining unit is configured to perform a modulo operation for the serial number of the random access parameter and the total number of resources in the resource list, where the operation result indicates a default common enhanced dedicated channel resource corresponding to the random access parameter and the operation is expressed by using a formula: X=SigInd mod Y, where:

X is a default common enhanced dedicated channel resource index, Y is the total number of resources in the resource list, and SigInd is an actual serial number of the random access parameter on a corresponding PRACH.

For more descriptions of the optional apparatus, reference may be made to the descriptions in method Embodiment 9, which are not repeatedly described herein.

This embodiment of the present invention provides an apparatus for obtaining a mapping between a random access parameter and a resource, in this technical solution, a random access parameter list is obtained, and a serial number of a random access parameter is obtained; a UE obtains a resource list and can obtain a mapping between the random access parameter and a default enhanced dedicated channel resource according to the serial number of the random access parameter and the number of resources in the obtained resource list; and in a case that there is more than one PRACH, a solution of obtaining a mapping between the random access parameter and the default enhanced dedicated channel resource is provided, thereby improving random access efficiency. After a network side determines a mapping manner between the random access parameter (that is, a signature and a PRACH) and a default common E-DCH resource according to this solution, the UE initiates a random access process after selecting a random access parameter; a NodeB can determine, according to a detected signature and PRACH, a resource that the UE wants to obtain, and grants the resource by using an AI; and if the resource has already been occupied, the NodeB can indicate another unoccupied resource by using an EAI.

Embodiment 11

Figure 14:
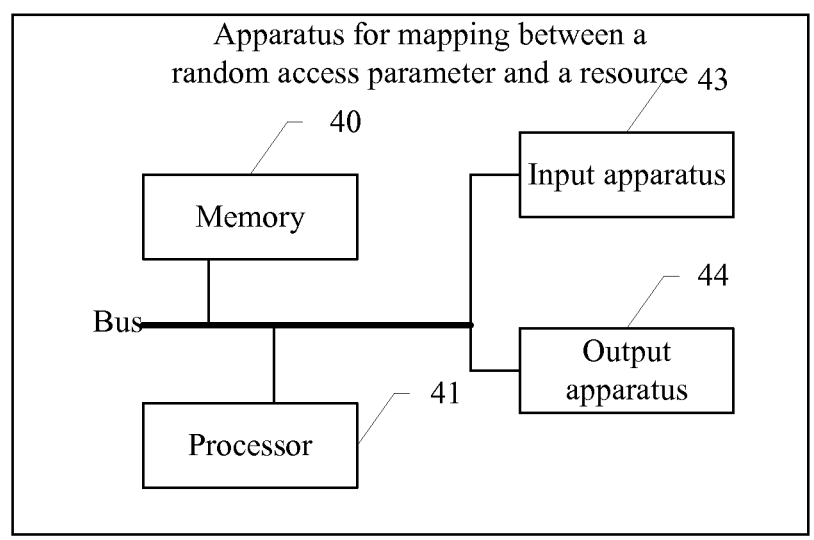
FIG. 14 is a schematic diagram of an apparatus entity of an apparatus for mapping a random access parameter to a resource according to method Embodiment 9 of the present invention.

This embodiment of the present invention further provides an apparatus for obtaining a mapping between a random access parameter and a resource. A structural schematic diagram of the apparatus is shown in FIG. 14, which includes a memory 40, a processor 41, an input apparatus 43, and an output apparatus 44 that are separately connected to a bus.

The memory 40 is configured to store data input from the input apparatus 43 and may further store information such as a file required by the processor 41 to process data.

The input apparatus 43 and the output apparatus 44 are ports for communication between a data analysis device and another device, and may further include an external output device connected to the data analysis device, for example, a display, a keyboard, a mouse, and a printer.

The processor 41 in this embodiment may obtain, from the input apparatus 43, data needed for processing, and the processor 41 may also control the output apparatus 44 to transmit, to another device, data obtained from the processing.

The processor 41 provided in this embodiment of the present invention is specifically configured to:

obtain a random access parameter list, and obtain a serial number of a parameter in the random access parameter list; obtain a resource list; and obtain a mapping between the random access parameter and a common enhanced dedicated channel resource in the resource list according to the obtained serial number of the random access parameter and the total number of resources in the obtained resource list, so that a network side determines, according to the random access parameter sent by the UE, whether a corresponding common enhanced dedicated channel resource is available.

Optionally, when the random access parameter list in the processor 41 includes a random access parameter in a first system information block and a random access parameter in type 1 in a second system information block; and a serial number of the random access parameter in the first system information block is smaller than a serial number of the random access parameter in type 1, the obtaining, by the processor 41, a resource list specifically includes: obtaining a list of a common enhanced dedicated channel resource corresponding to a cell-level transmission time interval TTI in the first system information block; and the obtaining, in the processor 41, a mapping between the random access parameter and a common enhanced dedicated channel resource according to the obtained serial number of the random access parameter and the total number of resources in the obtained resource list specifically includes:

performing a modulo operation for the serial number of the parameter in the random access parameter list and the total number of resources in the resource list, where the operation result indicates a default common E-DCH resource corresponding to the random access parameter and the operation is expressed by using a formula: X=SigInd mod Y, where:

X is a default Common E-DCH resource index, Y is the total number of resources in the resource list, and SigInd is the serial number of the parameter in the random access parameter list.

Optionally, when the random access parameter list in the processor 41 includes a random access parameter in type 2 in a second system information block and a random access parameter in type 3 in the second system information block, the obtaining a resource list specifically includes: obtaining a list of a 2 ms common E-DCH resource in a first system information block; and the obtaining, in the processor 41, a mapping between the random access parameter and a common enhanced dedicated channel resource according to the obtained serial number of the random access parameter and the total number of resources in the obtained resource list specifically includes:

performing a modulo operation for the serial number of the parameter in the random access parameter list and the total number of resources in the obtained list of the 2 ms common E-DCH resource in the first system information block, where the operation result is used to indicate a default common E-DCH resource corresponding to the random access parameter and the operation is expressed by using a formula: X'=SigInd mod Z, where:

X' is a default Common E-DCH resource index and is used to indicate a serial number of a resource in the list of the 2 ms common E-DCH resource, Z is the total number of resources in the list of the 2 ms common E-DCH resource in the first system information block, and SigInd is the serial number of the parameter in the random access parameter list.

Optionally, when the random access parameter list in the processor 41 includes a random access parameter in type 2 in a second system information block and a random access parameter in type 3 in the second system information block, the obtaining, in the processor 41, a resource list specifically includes: obtaining a list that includes only a 2 ms common E-DCH resource in a first system information block; and the obtaining, in the processor 41, a mapping between the random access parameter and a common enhanced dedicated channel resource according to the obtained serial number of the random access parameter and the total number of resources in the obtained resource list specifically includes:

performing a modulo operation for the serial number of the parameter in the random access parameter list and the total number of resources in the obtained list of the 2 ms common E-DCH resource in the first system information block, where the operation result is expressed as (SigInd mod Z); and obtaining, according to a formula X'=(Z−1)−(SigInd mod Z), a default common E-DCH resource corresponding to the random access parameter, where:

X' is a default Common E-DCH resource index and is used to indicate a serial number of a resource in the list of the 2 ms common E-DCH resource, Z is the total number of resources in the list of the 2 ms common E-DCH resource in the first system information block, and SigInd is the serial number of the parameter in the random access parameter list.

Optionally, when the random access parameter list in the processor 41 includes a random access parameter in type 2 in a second system information block, the obtaining, in the processor 41, a resource list specifically includes: obtaining a list of a 2 ms common E-DCH resource in a first system information block; and the obtaining, in the processor 41 a mapping between the random access parameter and a common enhanced dedicated channel resource according to the obtained serial number of the random access parameter and the total number of resources in the obtained resource list specifically includes:

performing a modulo operation for the serial number of the parameter in the random access parameter list and the total number of resources in the obtained list of the 2 ms common E-DCH resource in the first system information block, where the operation result is used to indicate a default common E-DCH resource corresponding to the random access parameter and the operation is expressed by using a formula: X'=SigInd mod Z or X'=(Z−1)−(SigInd mod Z), where:

X' is a default Common E-DCH resource index and is used to indicate a serial number of a resource in the list of the 2 ms common E-DCH resource, Z is the total number of resources in the list of the 2 ms common E-DCH resource in the first system information block, and SigInd is the serial number of the parameter in the random access parameter list.

Optionally, when the random access parameter list in the processor 41 includes a random access parameter in type 3 in a second system information block, the obtaining a resource list specifically includes: obtaining a list of a 2 ms common E-DCH resource in a first system information block; and the obtaining a mapping between the random access parameter and a common enhanced dedicated channel resource according to the obtained serial number of the random access parameter and the total number of resources in the obtained resource list specifically includes:

performing a modulo operation for the serial number of the parameter in the random access parameter list and the total number of resources in the obtained list of the 2 ms common E-DCH resource in the first system information block, where the operation result is used to indicate a default common E-DCH resource corresponding to the random access parameter and the operation is expressed by using a formula: X'=SigInd mod Z or X'=(Z−1)−(SigInd mod Z), where:

X' is a default Common E-DCH resource index and is used to indicate a serial number of a resource in the list of the 2 ms common E-DCH resource, Z is the total number of resources in the list of the 2 ms common E-DCH resource in the first system information block, and SigInd is the serial number of the parameter in the random access parameter list.

Optionally, the processor 41 is further configured to obtain a corresponding serial number of the default common enhanced dedicated channel common E-DCH resource in the first system information block by using a formula X=X'+concurrent TTI partition index, where X is the corresponding serial number of the default common E-DCH resource in the first system information block, and the Concurrent TTI partition index is a start serial number of the 2 ms common E-DCH resource in the first system information block.

Optionally, when the random access parameter list in the processor 41 includes four parts: a random access parameter in a first system information block, a random access parameter in type 1 in a second system information block, a random access parameter in type 2 in the second system information block, and a random access parameter in type 3 in the second system information block; or, the random access parameter list includes three parts: a random access parameter in a first system information block, a random access parameter in type 2 in a second system information block, and a random access parameter in type 3 in the second system information block; or, the random access parameter list includes only a random access parameter in type 1 in a second system information block; or, the random access parameter list includes a random access parameter in a first system information block and a random access parameter in type 2 in a second system information block; or, the random access parameter list includes a random access parameter in a first system information block and a random access parameter in type 3 in a second system information block, the obtaining a mapping between the random access parameter and a common enhanced dedicated channel resource according to the obtained serial number of the random access parameter and the total number of resources in the obtained resource list specifically includes:

performing a modulo operation for the serial number of the parameter in the random access parameter list and the total number of resources in the resource list, where the operation result indicates a default common E-DCH resource corresponding to the random access parameter and the operation is expressed by using a formula: X=SigInd mod Y, where:

X is a default Common E-DCH resource index, Y is the total number of resources in the resource list, and SigInd is the serial number of the parameter in the random access parameter list.

Optionally, when the random access parameter list in the processor 41 includes a random access parameter in type 1 in a second system information block and a random access parameter in a first system information block; and a serial number of the random access parameter in the first system information block is larger than a serial number of the random access parameter in type 1, the obtaining, in the processor 41, a mapping between the random access parameter and a common enhanced dedicated channel resource according to the obtained serial number of the random access parameter and the total number of resources in the obtained resource list specifically includes:

performing a modulo operation for the serial number of the random access parameter in the first system information block in the random access parameter list and the total number of resources in the resource list, where the operation result indicates a default common E-DCH resource corresponding to the random access parameter in the first system information block and the operation is expressed by using a formula X=SigInd mod Y, where X is a default common E-DCH resource index, Y is the total number of resources in the resource list, and SigInd is the serial number of the random access parameter in the first system information block in the random access parameter list; or obtaining, according to a formula X=(SigInd+W) mod Y, a default common E-DCH resource corresponding to the random access parameter in type 1, where:

SigInd is the serial number of the random access parameter in type 1 in the random access parameter list, W is the total number of random access parameters in the first system information block in the list, Y is the total number of resources in the resource list, and X is a default common enhanced dedicated channel resource index.

When the serial number of the random access parameter in the random access parameter list in the processor 41 is an actual serial number of each parameter on a corresponding physical random access channel (PRACH), the obtaining, in the processor 41, a mapping between the random access parameter and a common enhanced dedicated channel resource according to the obtained serial number of the random access parameter and the total number of resources in the obtained resource list specifically includes:

performing a modulo operation for the serial number of the parameter in the random access parameter list and the total number of resources in the resource list, where the operation result indicates a default common enhanced dedicated channel resource corresponding to the random access parameter and the operation is expressed by using a formula: X=SigInd mod Y, where:

X is a default common enhanced dedicated channel resource index, Y is the total number of resources in the resource list, and SigInd is an actual serial number of the random access parameter on a corresponding PRACH.

Optionally, the processor 41 obtains a list of all resources in the first system information block and obtains the list of the 2 ms common enhanced dedicated channel resource according to a start serial number of a 2 ms resource configured on a network side device.

A person of ordinary skill in the art may understand that all or a part of the steps of the methods in the embodiments may be implemented by a program instructing relevant hardware. The program may be stored in a computer readable storage medium. The storage medium may include: a ROM, a RAM, a magnetic disk, or an optical disc.

The foregoing describes, in detail, a method and an apparatus for obtaining a mapping between a random access parameter and a resource provided in the embodiments of the present invention. In this specification, specific examples are used to describe the principle and implementation manners of the present invention, and the description of the embodiments is only intended to make the method and core idea of the present invention more comprehensible. Meanwhile, a person of ordinary skill in the art may, based on the idea of the present invention, make modifications with respect to the specific implementation manners and the application scope. Therefore, the content of this specification shall not be construed as a limitation to the present invention.

What is claimed is:

1. A method for obtaining a mapping between a random access parameter and a resource, comprising:
    obtaining, by a user equipment, a random access parameter list, and obtaining a serial number of a parameter in the random access parameter list;
    obtaining, by the user equipment, a resource list; and
    obtaining, by the user equipment, the mapping between the random access parameter and a common enhanced dedicated channel (E-DCH) resource in the resource list according to the obtained serial number of the random access parameter and a total number of resources in the obtained resource list; and
    sending, by the user equipment, a selected random access parameter to a network side device;
    receiving, by the user equipment, from the network side device, a response which indicates whether the common E-DCH resource mapped with the selected random access parameter is available;
    wherein the random access parameter list comprises a random access parameter in type 2 or in type 3 in a second system information block;
    wherein obtaining the resource list comprises: obtaining a list of a 2 ms common E-DCH resource in a first system information block; and
    wherein obtaining the mapping between the random access parameter and the common E-DCH resource comprises:
    obtaining the mapping between the random access parameter and the common E-DCH resource by using a formula X'=SigInd mod Z, wherein:
    X' is a default common E-DCH resource index, Z is the total number of resources in the list of the 2 ms common E-DCH resource in the first system information block, SigInd is the serial number of the parameter in the random access parameter list, and mod is a modulo operation.

2. The method according to claim 1, wherein the random access parameter list comprises a random access parameter in a first system information block and a random access parameter in type 1 in a second system information block; and a serial number of the random access parameter in the first system information block is smaller than a serial number of the random access parameter in type 1;
    wherein obtaining the resource list comprises: obtaining a list of a common E-DCH resource corresponding to a cell-level transmission time interval (TTI) in the first system information block; and
    wherein obtaining the mapping between the random access parameter and the common E-DCH resource comprises: obtaining the mapping between the random access parameter and the common E-DCH resource by using a formula X=SigInd mod Y, wherein:
    X is a default common E-DCH resource index, Y is the total number of resources in the resource list, and SigInd is the serial number of the parameter in the random access parameter list, and mod is a modulo operation.

3. The method according to claim 1, wherein the random access parameter list comprises a random access parameter in type 2 in a second system information block and a random access parameter in type 3 in the second system information block;
    wherein obtaining the resource list comprises: obtaining a list of a 2 ms common E-DCH resource in a first system information block; and
    wherein obtaining the mapping between the random access parameter and the common E-DCH resource comprises:
    obtaining the mapping between the random access parameter and the common E-DCH resource by using a formula X'=SigInd mod Z, wherein:
    X' is a default common E-DCH resource index, Z is the total number of resources in the list of the 2 ms common E-DCH resource in the first system information block, SigInd is the serial number of the parameter in the random access parameter list, and mod is a modulo operation.

4. The method according to claim 1, further comprising: obtaining a corresponding serial number of the default common E-DCH resource in the first system information block by using a formula X=X'+concurrent TTI partition index, wherein X is the corresponding serial number of the default common E-DCH resource in the first system information block, and the Concurrent transmission time interval (TTI) partition index is a start serial number of the 2 ms common E-DCH resource in the first system information block.

5. The method according to claim 1, wherein the random access parameter list comprises: a random access parameter in a first system information block, a random access parameter in type 1 in a second system information block, a random access parameter in type 2 in the second system information block, and a random access parameter in type 3 in the second system information block; or, the random access parameter list comprises a random access parameter in a first system information block, a random access parameter in type 2 in a second system information block, and a random access parameter in type 3 in the second system information block; or, the random access parameter list comprises only a random access parameter in type 1 in a second system information block; or, the random access parameter list comprises a random access parameter in a first system information block and a random access parameter in type 2 in a second system information block; or, the random access parameter list comprises a random access parameter in a first system information block and a random access parameter in type 3 in a second system information block; and
    wherein obtaining the mapping between the random access parameter and the common E-DCH resource comprises:
    obtaining the mapping between the random access parameter and the common E-DCH resource by using a formula X'=SigInd mod Y, wherein:
    X' is a default common E-DCH resource index, Y is the total number of resources in the resource list, SigInd is the serial number of the parameter in the random access parameter list, and mod is a modulo operation.

6. The method according to claim 1, wherein obtaining the random access parameter list comprises:
    receiving a system broadcast message sent by a network side device, wherein the system broadcast message comprises a random access parameter; and
    numbering, according to a sequence configured in the system broadcast message, the random access parameter serially, so as to obtain the random access parameter list.

7. The method according to claim 1, wherein the first system information block is a system information block 5

(SIB5) and the second system information block is a system information block 22 (SIB22).

8. The method according to claim 1, wherein obtaining the list of the 2 ms common E-DCH resource in the first system information block comprises:
obtaining a list of all resources in the first system information block, and obtaining the list of the 2 ms common E-DCH resource according to a start serial number of a 2 ms resource configured on the network side device.

9. An apparatus for obtaining a mapping between a random access parameter and a resource, comprising a processor and a memory including processor-executable instructions executed by the processor to perform operations comprising:
obtaining a random access parameter list, and obtaining a serial number of a parameter in the random access parameter list;
obtaining a resource list; and
obtaining the mapping between the random access parameter and a common enhanced dedicated channel (E-DCH) resource in the resource list according to the obtained serial number of the random access parameter and a total number of resources in the obtained resource list;
sending, a selected random access parameter to a network side device;
receiving, from the network side device, a response which indicates whether a common E-DCH resource mapped with the selected random access parameter is available;
wherein the random access parameter list comprises a random access parameter in type 2 or in type 3 in a second system information block;
wherein obtaining the resource list comprises: obtaining a list of a 2 ms common E-DCH resource in a first system information block; and
wherein obtaining the mapping between the random access parameter and the common E-DCH resource comprises:
obtaining the mapping between the random access parameter and the common E-DCH resource by using a formula X'=SigInd mod Z, wherein:
X' is a default common E-DCH resource index, Z is the total number of resources in the list of the 2 ms common E-DCH resource in the first system information block, SigInd is the serial number of the parameter in the random access parameter list, and mod is a modulo operation.

10. The apparatus according to claim 9, wherein the random access parameter list comprises a random access parameter in a first system information block and a random access parameter in type 1 in a second system information block; and a serial number of the random access parameter in the first system information block is smaller than a serial number of the random access parameter in type 1;
wherein obtaining the resource list comprises: obtaining a list of a common E-DCH resource corresponding to a cell-level transmission time interval TTI in the first system information block; and
wherein obtaining the mapping between the random access parameter and the E-DCH resource comprises: obtaining the mapping between the random access parameter and the common E-DCH resource by using a formula X=SigInd mod Y, wherein:
X is a default common E-DCH resource index, Y is the total number of resources in the resource list, and SigInd is the serial number of the parameter in the random access parameter list, and mod is a modulo operation.

11. The apparatus according to claim 9, wherein the random access parameter list comprises a random access parameter in type 2 in a second system information block and a random access parameter in type 3 in the second system information block;
wherein obtaining the resource list comprises: obtaining a list of a 2 ms common E-DCH resource in a first system information block; and
wherein obtaining the mapping between the random access parameter and the common E-DCH resource comprises:
obtaining the mapping between the random access parameter and the common E-DCH resource by using a formula X'=SigInd mod Z, wherein:
X' is a default common E-DCH resource index, Z is the total number of resources in the list of the 2 ms common E-DCH resource in the first system information block, SigInd is the serial number of the parameter in the random access parameter list, and mod is a modulo operation.

12. The apparatus according to claim 9, wherein the operations further comprise:
obtaining a corresponding serial number of the default common E-DCH common (E-DCH) resource in the first system information block by using a formula X=X'+concurrent TTI partition index, wherein X is the corresponding serial number of the default common E-DCH resource in the first system information block, and the Concurrent transmission time interval (TTI) partition index is a start serial number of the 2 ms common E-DCH resource in the first system information block.

13. The apparatus according to claim 9, wherein the random access parameter list comprises: a random access parameter in a first system information block, a random access parameter in type 1 in a second system information block, a random access parameter in type 2 in the second system information block, and a random access parameter in type 3 in the second system information block; or, the random access parameter list comprises a random access parameter in a first system information block, a random access parameter in type 2 in a second system information block, and a random access parameter in type 3 in the second system information block; or, the random access parameter list comprises only a random access parameter in type 1 in a second system information block; or, the random access parameter list comprises a random access parameter in a first system information block and a random access parameter in type 2 in a second system information block; or, the random access parameter list comprises a random access parameter in a first system information block and a random access parameter in type 3 in a second system information block; and
wherein obtaining the mapping between the random access parameter and the common E-DCH resource comprises:
obtaining the mapping between the random access parameter and the common E-DCH resource by using a formula X'=SigInd mod Y, wherein:
X' is a default common E-DCH resource index, Y is the total number of resources in the resource list, SigInd is the serial number of the parameter in the random access parameter list, and mod is a modulo operation.

14. The apparatus according to claim 9, wherein the operation of obtaining the random access parameter list specifically comprises:
- receiving a system broadcast message sent by a network side device, wherein the system broadcast message comprises a random access parameter; and
- numbering, according to a sequence configured in the system broadcast message, the random access parameter serially, so as to obtain the random access parameter list.

15. The apparatus according to claim 9, wherein the first system information block is a system information block 5 (SIB5) and the second system information block is a system information block 22 (SIB22).

16. The apparatus according to claim 9, wherein the operation of obtaining the list of the 2 ms common E-DCH resource in the first system information block comprises:
- obtaining a list of all resources in the first system information block, and obtaining the list of the 2 ms common E-DCH resource according to a start serial number of a 2 ms resource configured on the network side device.

\* \* \* \* \*

UNITED STATES PATENT AND TRADEMARK OFFICE
CERTIFICATE OF CORRECTION

PATENT NO.         : 9,860,910 B2                                             Page 1 of 1
APPLICATION NO.    : 14/800500
DATED              : January 2, 2018
INVENTOR(S)        : Pang et al.

It is certified that error appears in the above-identified patent and that said Letters Patent is hereby corrected as shown below:

On the Title Page

(72) Inventors, city/country for third inventor Ma, "Shenzhen (SE)" should read -- Shenzhen (CN) --.

Page 2, Foreign Patent Documents, "WO2257086A1" should read -- EP2257086A1 --.

Signed and Sealed this
Twenty-second Day of May, 2018

Andrei Iancu
*Director of the United States Patent and Trademark Office*